(12) United States Patent
Jung et al.

(10) Patent No.: US 11,961,432 B2
(45) Date of Patent: Apr. 16, 2024

(54) DISPLAY DEVICE

(71) Applicant: Samsung Display Co., LTD., Yongin-si (KR)

(72) Inventors: Joo Hye Jung, Seoul (KR); Keon Woo Kim, Cheonan-si (KR); Dong Hyun Lee, Suwon-si (KR); Deuk Jong Kim, Cheonan-si (KR); Deok Young Choi, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 108 days.

(21) Appl. No.: 16/919,004

(22) Filed: Jul. 1, 2020

(65) Prior Publication Data
US 2021/0110745 A1   Apr. 15, 2021

(30) Foreign Application Priority Data
Oct. 14, 2019   (KR) .................. 10-2019-0127109

(51) Int. Cl.
*G09G 3/00* (2006.01)
*G01M 5/00* (2006.01)

(52) U.S. Cl.
CPC .......... *G09G 3/006* (2013.01); *G01M 5/0033* (2013.01); *G01M 5/0083* (2013.01); *G09G 3/035* (2020.08); *G09G 2330/12* (2013.01)

(58) Field of Classification Search
CPC .... G09G 3/006; G09G 3/035; G09G 2330/12; G09G 3/2092; G09G 2300/0408; G09G 2300/0426; G09G 2300/043; G09G 2380/02; G01M 5/0033; G01M 5/0083; H01L 27/1244; H10K 50/805; H10K 59/131; H10K 71/70
See application file for complete search history.

(56) References Cited

U.S. PATENT DOCUMENTS

| | | | |
|---|---|---|---|
| 9,076,362 B2 * | 7/2015 | Kim | G02F 1/136204 |
| 10,304,921 B2 * | 5/2019 | Lee | H10K 59/1213 |
| 10,748,970 B2 * | 8/2020 | Kim | G01K 7/16 |
| 11,088,238 B2 * | 8/2021 | Shim | H10K 59/131 |
| 11,232,728 B2 * | 1/2022 | Hao | H10K 71/70 |
| 2016/0140896 A1 * | 5/2016 | Kwon | G09G 3/006 |
| | | | 345/76 |
| 2016/0179229 A1 * | 6/2016 | Ahn | G06F 3/0443 |
| | | | 345/173 |

(Continued)

FOREIGN PATENT DOCUMENTS

KR   20000031946   6/2000
KR   1020090091711   8/2009

(Continued)

OTHER PUBLICATIONS

The Extended European Search Report—European Application No. 20201637.4 dated May 14, 2021, citing references listed within.

*Primary Examiner* — Jose R Soto Lopez
(74) *Attorney, Agent, or Firm* — CANTOR COLBURN LLP

(57) ABSTRACT

A display device includes a display area and a non-display area disposed around the display area and including a pad area. The display device includes a resistance checker disposed in the non-display area, resistance test pads disposed in the pad area, resistance test lines connecting the resistance checker with the resistance test pad, and crack test lines disposed on the outer side of the resistance checker. The resistance test lines intersect the crack test lines in a plan view.

21 Claims, 20 Drawing Sheets

(56) References Cited

U.S. PATENT DOCUMENTS

| | | | |
|---|---|---|---|
| 2016/0260367 A1* | 9/2016 | Kwak | G09G 3/3291 |
| 2016/0307971 A1* | 10/2016 | Jeon | G09G 3/3233 |
| 2017/0199439 A1* | 7/2017 | Jia | G02F 1/136259 |
| 2017/0263880 A1* | 9/2017 | Lee | H10K 50/80 |
| 2017/0309651 A1* | 10/2017 | Kim | G02F 1/1345 |
| 2017/0358641 A1* | 12/2017 | Park | H10K 77/111 |
| 2018/0053466 A1* | 2/2018 | Zhang | G01L 1/2281 |
| 2018/0158741 A1* | 6/2018 | Kim | H01L 22/32 |
| 2018/0158894 A1* | 6/2018 | Park | H10K 71/70 |
| 2018/0166525 A1* | 6/2018 | Kim | H10K 71/70 |
| 2018/0174505 A1* | 6/2018 | Mandlik | G09G 3/035 |
| 2018/0182274 A1* | 6/2018 | Jung | G09G 3/006 |
| 2018/0204901 A1* | 7/2018 | Hwang | H10K 59/123 |
| 2018/0233436 A1 | 8/2018 | Lee et al. | |
| 2018/0336808 A1* | 11/2018 | Lee | G09G 3/20 |
| 2018/0342185 A1* | 11/2018 | Lee | G09G 3/006 |
| 2019/0019441 A1* | 1/2019 | Shin | H04N 17/004 |
| 2019/0157607 A1* | 5/2019 | Kim | H10K 59/131 |
| 2020/0025820 A1* | 1/2020 | Zhao | G09G 3/3225 |
| 2020/0111862 A1* | 4/2020 | Park | H10K 50/8445 |
| 2020/0203236 A1* | 6/2020 | Lee | G01R 31/2884 |
| 2020/0212356 A1* | 7/2020 | Kim | H10K 59/124 |
| 2021/0335974 A1* | 10/2021 | Zhou | G09G 3/00 |
| 2021/0343954 A1* | 11/2021 | Tian | H10K 59/131 |

FOREIGN PATENT DOCUMENTS

| | | |
|---|---|---|
| KR | 1020130127345 | 11/2013 |
| KR | 1020180064596 | 6/2018 |
| KR | 1020180065061 | 6/2018 |

\* cited by examiner

S_OP_1: S_OP1_1, S_OP2_1, S_OP3_1, S_OP4_1

S_OP_1: S_OP1_1, S_OP2_1, S_OP3_1, S_OP4_1

S_OP: S_OP1, S_OP2, S_OP3, S_OP4

DISPLAY DEVICE

This application claims priority to Korean Patent Application No. 10-2019-0127109 filed on Oct. 14, 2019, and all the benefits accruing therefrom under 35 U.S.C. § 119, the content of which in its entirety is herein incorporated by reference.

BACKGROUND

1. Field

Exemplary embodiments of the invention relate to a display device.

2. Description of the Related Art

As the information-oriented society evolves, various demands for display devices are increasing. The display devices are being employed by a variety of electronic devices such as smart phones, digital cameras, laptop computers, navigation devices, and smart televisions. The display devices may be flat panel display devices such as a liquid-crystal display device, a field emission display device, and a light-emitting display device. Among such flat panel display devices, a light-emitting display device includes a plurality of pixels each including a light-emitting element so that each of the plurality of pixels of the display panel emits light by themselves. Accordingly, a light-emitting display device displays images without a backlight unit that supplies light to the display panel.

Each of the plurality of pixels further includes a driving transistor for controlling an amount of driving current supplied to the light-emitting element according to a voltage at a gate electrode, and a scan transistor for supplying a data voltage from a data line to the gate electrode of the driving transistor in response to a scan signal from a scan line. It is desired to inspect such display devices for cracks and resistance.

SUMMARY

An exemplary embodiment of the invention provides a display device capable of avoiding a short-circuit between resistance test lines and crack test lines.

It should be noted that advantages of the invention are not limited to the above-mentioned advantage, and other advantages of the invention will be apparent to those skilled in the art from the following descriptions.

Additional features of the invention will be set forth in the description which follows, and in part will be apparent from the description, or may be learned by practice of the invention.

An exemplary embodiment of a display device includes a display area and a non-display area disposed around the display area and including a pad area. The display device includes a resistance checker disposed in the non-display area, resistance test pads disposed in the pad area, resistance test lines connecting the resistance checker with the resistance test pad, and crack test lines disposed on the outer side of the resistance checker. The resistance test lines intersect the crack test lines in a plan view.

In an exemplary embodiment, the display device may further include a crack detector disposed in the non-display area and connected to the crack test lines, and crack test pads disposed in the pad area and connected to the crack detector.

In an exemplary embodiment, the crack test pads may be aligned with an edge of the display device while the resistance test pads may be disposed further inside than the edge of the display device and the crack test pads.

In an exemplary embodiment, the crack test lines may surround the display area in the plan view.

In an exemplary embodiment, each of the crack test lines may include a first test line part connected to the crack detector, a second test line part connected to the first test line part, and a third test line part connected to the second test line part, where the first test line part is extended in a first direction. The second test line part may be extended in a second direction intersecting the first direction, and the third test line part may surround a longer side of the display area.

In an exemplary embodiment, the resistance test lines may intersect the first test line part in the plan view.

In an exemplary embodiment, the display device may further include a printed circuit board ("PCB") attached on the pad area and electrically connected to the resistance test pads and the crack test pads, and the PCB may include a driving member.

In an exemplary embodiment, the resistance test pads may include an input resistance test pad and output resistance test pads, and the driving member may input a first voltage to the input resistance test pad and may receive a second voltage from the output resistance test pads.

In an exemplary embodiment, the resistance test lines may include an input resistance test line connected to the input resistance test pad, and output resistance test lines connected to the output resistance test pads, the input resistance test line may include a first input resistance test line physically connected to the input resistance test pad, and a second input resistance test line connecting between the first input resistance test line with the output resistance test lines, and the second input resistance test line may include a bent portion.

In an exemplary embodiment, the crack test pads and the resistance test pads may be aligned with an edge of the display device.

In an exemplary embodiment, the display device may further include a substrate, a first conductive layer disposed on the substrate, a first insulating layer disposed on the first conductive layer, a second conductive layer disposed on the first insulating layer, a second insulating layer disposed on the second conductive layer, a third conductive layer disposed on the second insulating layer, a third insulating layer disposed on the third conductive layer, and a fourth conductive layer disposed on the third insulating layer, where the crack test lines are provided as the first conductive layer or the second conductive layer, and where the resistance test lines are provided as the third conductive layer or the fourth conductive layer.

In an exemplary embodiment, the display device may further include a connection line branching off from the resistance test lines, and a test pad connected to the connection line, where the test pad is disposed further inside than the resistance test lines.

In an exemplary embodiment, the display device may further include a connection line branching off from the resistance test lines, where the connection line is aligned with an edge of the display device.

An exemplary embodiment of a display device includes a display area and a non-display area disposed around the display area and including a pad area. The display device includes a resistance checker disposed in the non-display area, resistance test pads disposed in the pad area, resistance test lines connecting the resistance checker with the resistance test pad, crack test lines, a crack detector connected to the crack test lines, and crack test pads disposed in the pad area and connected to the crack detector. The crack test pads and resistance test pads are aligned with an edge of the display device.

In an exemplary embodiment, the resistance test lines may intersect the crack test lines in a plan view In an exemplary embodiment, each of the crack test lines may include a first test line part connected to the crack detector, a second test line part connected to the first test line part, and a third test line part connected to the second test line part, where the first test line part is extended in a first direction. The second test line part may be extended in a second direction intersecting the first direction, and the third test line part may surround a longer side of the display area.

In an exemplary embodiment, the resistance test lines intersect the first test line part and the second test line part in the plan view.

In an exemplary embodiment, the resistance test lines may intersect the first test line part and the second test line part in the plan view but may not overlap with the second test line part.

In an exemplary embodiment, the display device may further include a connection line branching off from the resistance test lines, and a test pad connected to the connection line, where the test pad is disposed further inside than the resistance test lines.

In an exemplary embodiment, the display device may further include a connection line branching off from the resistance test lines, where the connection line is aligned with the edge of the display device.

In an exemplary embodiment, the details of one or more embodiments of the subject matter described in this specification are set forth in the accompanying drawings and the description below.

By an exemplary embodiment of the invention, it is possible to avoid a short-circuit between resistance test lines and crack test lines in a display device.

However, features of the invention are not restricted to the one set forth herein. The above and other features of the invention will become more apparent to one of ordinary skill in the art to which the invention pertains by referencing the detailed description of the invention given below.

BRIEF DESCRIPTION OF THE DRAWINGS

The above and other advantages and features of the invention will become more apparent by describing in detail exemplary embodiments thereof with reference to the attached drawings, in which.

DETAILED DESCRIPTION

Figure 1:
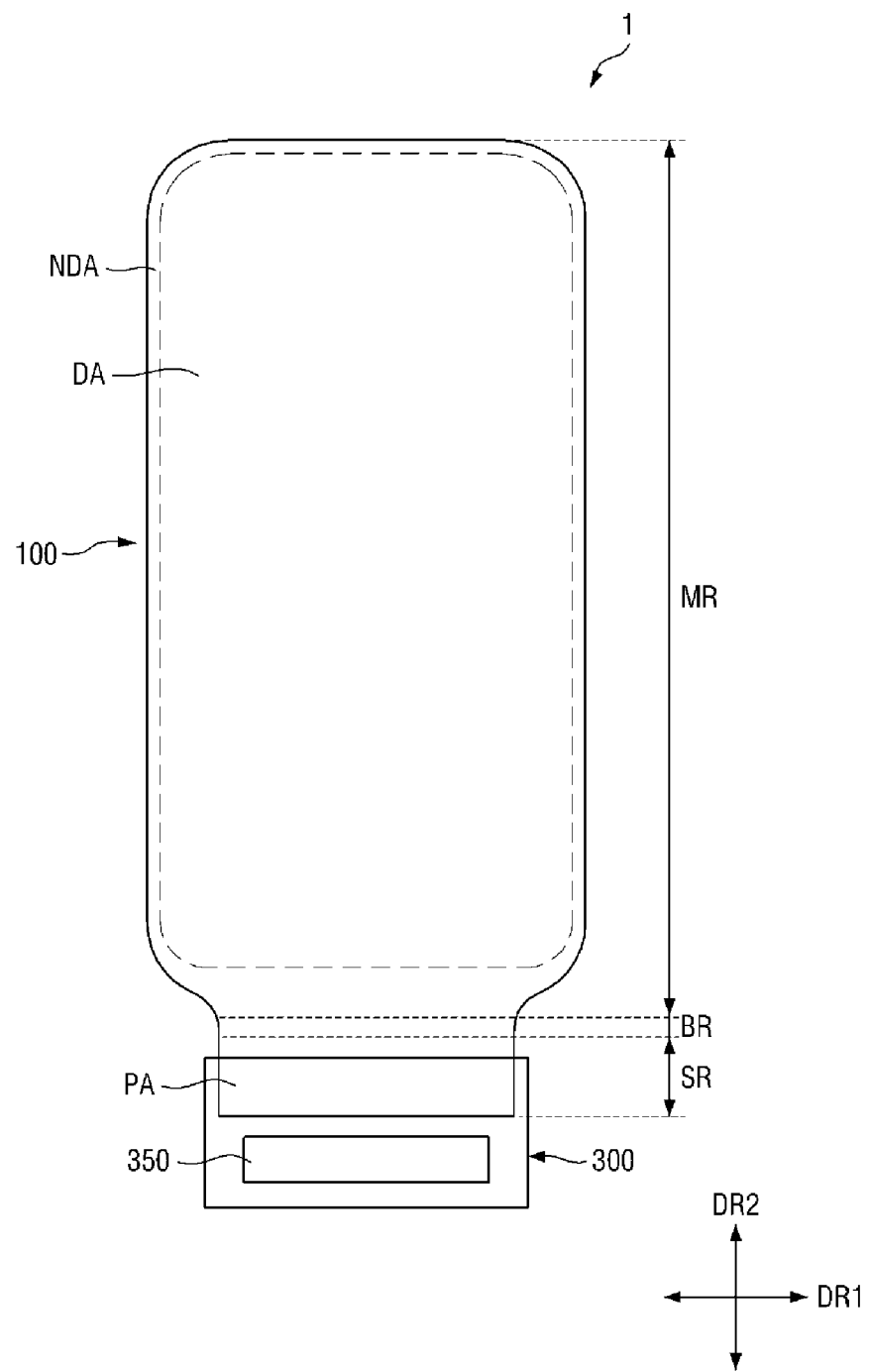
FIG. 1 is a plan view showing an exemplary embodiment of the layout of a display device according to the invention.

Advantages and features of the invention and methods to achieve them will become apparent from the descriptions of exemplary embodiments hereinbelow with reference to the accompanying drawings. However, the invention is not limited to exemplary embodiments disclosed herein but may be implemented in various different ways. The exemplary embodiments are provided for making the disclosure thorough and for fully conveying the scope of the invention to those skilled in the art. It is to be noted that the scope of the invention is defined only by the claims.

As used herein, a phrase "an element A on an element B" refers to that the element A may be disposed directly on the element B and/or the element A may be disposed indirectly on the element B via another element C. Like reference numerals denote like elements throughout the descriptions. The drawing figures, dimensions, ratios, angles, numbers of elements given in the drawings are merely illustrative and are not limiting.

Although terms such as first, second, etc. are used to distinguish arbitrarily between the elements such terms describe, and thus these terms are not necessarily intended to indicate temporal or other prioritization of such elements. These terms are used to merely distinguish one element from another. Accordingly, as used herein, a first element may be a second element within the technical scope of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. In addition, unless explicitly described to the contrary, the word "comprise" and variations such as "comprises" or "comprising" will be understood to imply the inclusion of stated elements but not the exclusion of any other elements.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

Features of various exemplary embodiments of the invention may be combined partially or totally. As will be clearly appreciated by those skilled in the art, technically various interactions and operations are possible. Various exemplary embodiments can be practiced individually or in combination.

Hereinafter, exemplary embodiments of the invention will be described with reference to the accompanying drawings.

Figure 2:
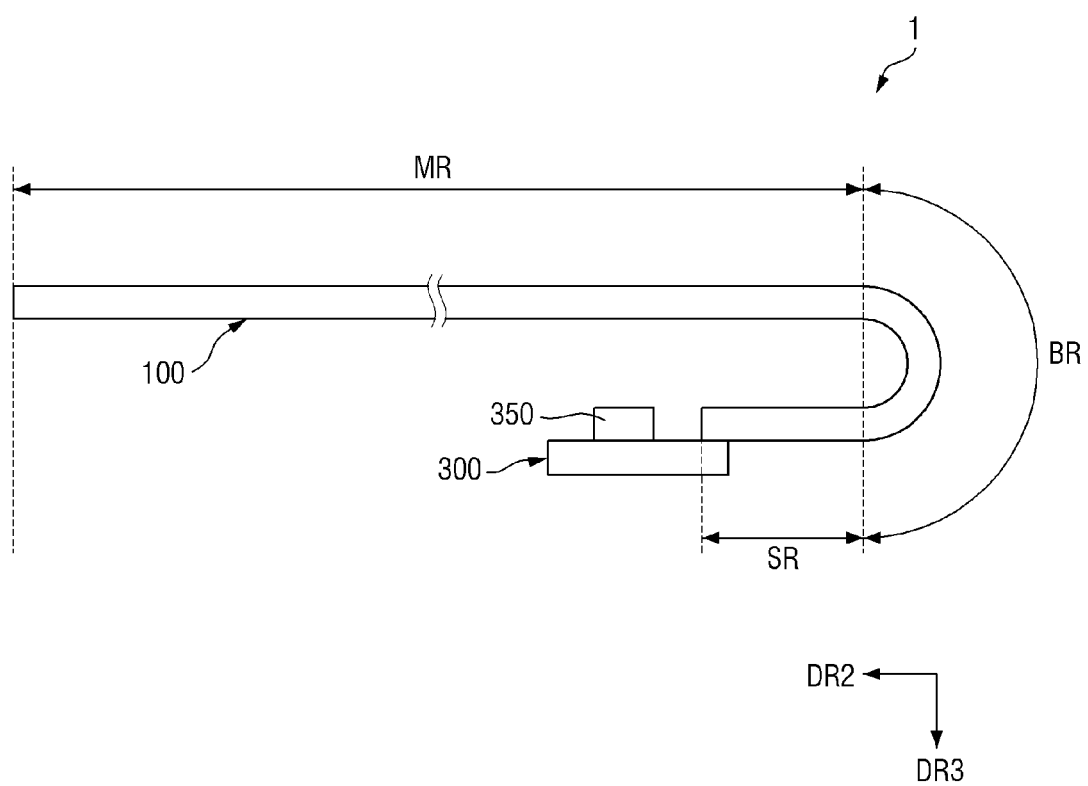
FIG. 2 is a schematic cross-sectional view of the display device of FIG. 1.

FIG. 1 is a plan view of an exemplary embodiment of a display device according to the invention. FIG. 2 is a schematic cross-sectional view of the display device of FIG. 1.

Referring to FIGS. 1 to 2, a display device 1 is for displaying moving images or still images. The display device 1 may be used as the display screen of portable electronic devices such as a mobile phone, a smart phone, a tablet personal computer ("PC"), a smart watch, a watch phone, a mobile communications terminal, an electronic notebook, an electronic book, a portable multimedia player ("PMP"), a navigation device and a ultra mobile PC ("UMPC"), as well as the display screen of various products such as a television, a notebook, a monitor, a billboard and the Internet of Things ("IoT").

The display device 1 may include a display area DA for displaying images, and a non-display area NDA disposed around the display area DA. The display area DA may have a rectangular shape having corners at the right angle or rounded corners in a plan view. It is, however, to be understood that the invention is not limited thereto. The shape of the display area DA is not limited to a rectangle, and it may have other shapes such as a circle and an ellipse. The display area DA includes an active area including a plurality of pixels.

The non-display area NDA is disposed around the display area DA. The non-display area NDA may be disposed adjacent to the two shorter sides of the display area DA. In addition, the non-display area NDA may be disposed adjacent to two longer sides as well as the two shorter sides of the display area DA, and may surround all of the sides of the display area DA. In other words, the non-display area NDA may be provided along the border of the display area DA.

The display device 1 may include a display panel 100 for displaying images, and a printed circuit board ("PCB") 300 attached to the display panel 100 and including a driving member 350 for driving the pixel circuitry of the display panel 100. In another exemplary embodiment, the driving member 350 may include a driving chip as an integrated circuit ("IC"), for example.

In an exemplary embodiment, an organic light-emitting display panel may be employed as the display panel 100. In the following description, the organic light-emitting display panel is employed as the display panel 100, but the invention is not limited thereto. Other types of display panels may be employed as the display panel 100, such as a liquid-crystal display ("LCD") panel, a field emission display ("FED") panel, and an electrophoretic device.

According to an exemplary embodiment of the invention, the display panel 100 may include a main region MR and a bending region BR. The main region MR may be flat. In the main region MR, the display area DA and a part of the non-display area NDA of the display panel 100 may be disposed.

The bending region BR may be disposed on at least one side of the main region MR. Although one bending region BR is disposed adjacent to the lower side of the main region MR in the second direction DR2 in the drawings, it is to be understood that the bending region BR may be disposed adjacent to any other sides, e.g., the left, right or upper side of the main region MR. In addition, the bending regions BR may be disposed on two or more sides of the main region MR.

The bending region BR may be bent in the third direction DR3 away from the display side (toward the rear side for a top-emission display device). As at least a portion of the non-display area NDA is bent away from the display side, the bezel of the display device may be reduced.

The display device 1 may further include a subsidiary region SR extended from the bending region BR. The subsidiary region SR may be parallel to the main region MR. The subsidiary region SR may overlap the main region MR in the thickness direction (i.e., third direction DR3). The bending region BR and the subsidiary region SR may be, but is not limited to, the non-display area.

The display panel 100 may include a pad area PA disposed in the non-display area NDA. The pad area PA may be disposed in the subsidiary region SR as shown in the drawings. It is, however, to be understood that the invention is not limited thereto. The pad area PA may be disposed in the main region MR or the bending region BR.

The display device 1 may further include the PCB 300 connected to the display panel 100. The PCB 300 may be attached to the pad area PA of the display panel 100 in the non-display area NDA. In an exemplary embodiment, the PCB 300 may be a flexible PCB ("FPCB"), for example. It is, however, to be understood that the invention is not limited thereto. The PCB 300 may be connected to the display panel 100 through a flexible film.

Figure 3:
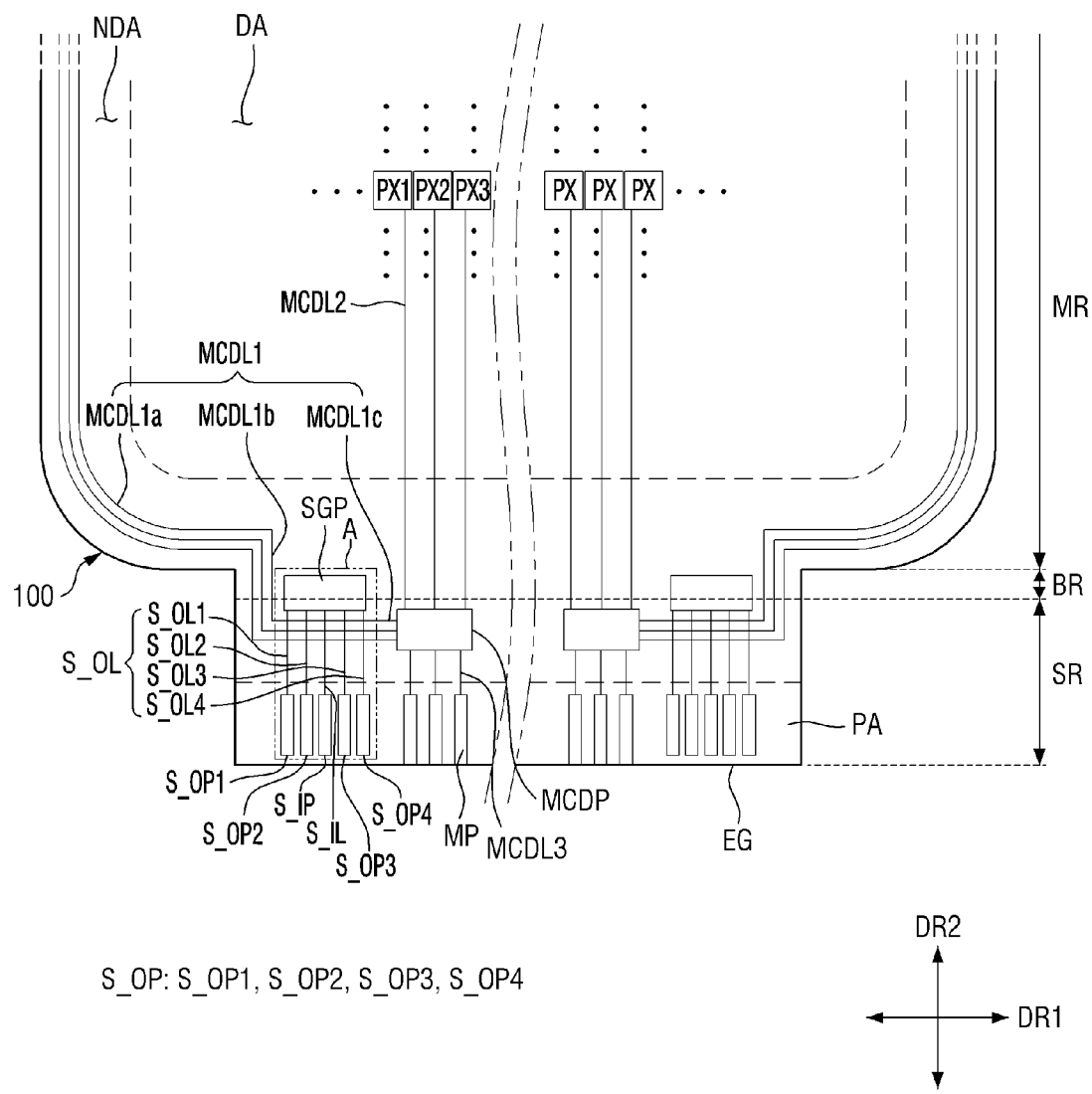
FIG. 3 is an enlarged plan view of the display device of FIG. 1.

FIG. 3 is an enlarged plan view of the display device of FIG. 1. In the example shown in FIG. 3, the PCB 300 of FIG. 1 is not disposed.

Referring to FIG. 3, the display area DA may include a plurality of pixels PX including first to third pixels PX1, PX2 and PX3. Specifically, the pixels PX may include first pixels PX1 for representing a first color, second pixels PX2 for representing a second color, and third pixels PX3 for representing a third color. In another exemplary embodiment, the first color may be red, the second color may be green, and the third color may be blue, for example. However, the invention is not limited thereto, and the first to third colors may be any other colors. The first pixels PX1, the second pixels PX2 and the third pixels PX3 may be arranged in a matrix. Specifically, as shown in FIG. 3, the first pixel PX1 to the third pixel PX3 may be repeatedly arranged. However, the invention is not limited thereto, and the pixels may be arranged in any other forms.

A plurality of pads may be disposed in the pad area PA of the non-display area NDA. The plurality of pads may include crack test pads MP and resistance test pads S_OP and S_IP. Although not shown in the drawings, the plurality of pads may include a data pad for transmitting a data signal applied from the driving member 350 of the PCB 300 to each pixel PX, a scan pad for transmitting a scan signal applied from the driving member 350 to a scan driver, or a scan control pad for transmitting a scan control signal applied from the driving member 350 to the scan driver. The resistance test pads S_OP and S_IP may include an input resistance test pad S_IP and output resistance test pads S_OP. The output resistance test pads S_OP may include a first output resistance test pad S_OP1 to a fourth output resistance test pad S_OP4. The PCB 300 may be attached on the pad area PA and electrically connected to the resistance test pads S_IP, S_OP1 to S_OP4 and the crack test pads MP.

A crack detector MCDP and a resistance checker SGP may be disposed in the non-display area NDA. The crack detector MCDP may be connected to a first crack test line MCDL1 to a third crack test line MCDL3. The third crack test lines MCDL3 may be connected to the crack detector MCDP and the crack test pad MP. The second crack detecting lines MCDL2 may be connected to the crack detector MCDP and the respective pixels PX1, PX2 and PX3. The first crack test lines MCDL1 may be connected to the crack detector MCDP to be extended on the outer side of the display area DA. The first crack test lines MCDL1 extended on the outer side of the display area DA may cover the lower side and the left side of the display area DA.

The crack detector MCDP and the resistance checker SGP may be disposed on each of the left part and the right part of the subsidiary region SR. Accordingly, the crack test pads MP, the resistance test pads S_OP and S_IP, the crack test lines MCDL1 to MCDL3, and the resistance test lines S_IL, S_OL1, S_OL2, S_OL3 and S_OL4 connected to the crack detector MCDP and the resistance checker SGP may also be disposed in the right part of the subsidiary region SR symmetrically. In the following description, only the crack test pads MP, the resistance test pads S_OP and S_IP, the crack test lines MCDL1 to MCDL3, the resistance test lines S_IL, S_OL1, S_OL2, S_OL3 and S_OL4, the crack detector MCDP and the resistance checker SGP disposed on the left part of the subsidiary region SR will be described.

The crack detector MCDP may include a plurality of switching elements. The crack test voltage applied to the crack test pad MP may be supplied to the plurality of switching elements of the crack detector MCDP through the third crack test lines MCDL3. The first crack test lines MCDL1 may be disposed on the outer side of the display area DA to send a signal indicative of whether there is a crack in the display device 1 to the plurality of switching elements of the crack detector MCDP.

Although three crack test pads MP and three first crack test lines MCDL1, three second crack lines MCDL2 and three third crack test lines MCDL3 are depicted in the drawings, the invention is not limited thereto. Four or more crack test pads and crack test lines may be disposed. In the following description, an exemplary embodiment in which three crack test pads MP and three first crack test lines MCDL1, three second crack lines MCDL2 and three third crack test lines MCDL3 are provided is described.

When a crack occurs in the non-display area NDA outside the display area DA, any of the first crack test lines MCDL1 may be disconnected due to the crack. In an exemplary embodiment, one of the three first crack test lines MCDL1 may be disconnected while the other two may not be disconnected, for example. When this happens, the switching element of the crack detector MCDP fails to transfer the crack test voltage applied from the crack test pad MP to the pixel PX because of the disconnected first crack test line MCDL1, whereas the switching elements of the crack detector MCDP may transfer the crack test voltage applied from the crack test pads MP to the pixels PX via the other two first crack test lines MCDL1 which are not disconnected. Typically, the crack test voltage may be a low-level voltage that may represent a black gray level. Accordingly, a pixel PX that has not received the crack test voltage represents white, whereas a pixel PX that has received the crack test voltage represents black. In this manner, the crack inspection may be carried out on the display device 1.

The first crack test lines MCDL1 may be divided into three parts. Each of the first crack test lines MCDL1 may include a (1-1) crack test line MCDL1a (or a third test line part) that is disposed on the left side (longer side) and the lower side of the display area DA and actually detects a crack outside the display area DA, a (1-2) crack test line MCDL1b (or a second test line part) that is connected to the (1-1) crack test line MCDL1a and extended in the second direction DR2, and a (1-3) crack test line MCDL1c (or a third test line part) that is connected to the (1-2) crack test line MCDL1b and the crack detector MCDP and extended in the first direction DR1 intersecting the second direction DR2.

The resistance checker SGP may be disposed further inside than the first crack test lines MCDL1. Specifically, the resistance checker SGP may be disposed between the (1-2) crack test lines MCDL1b positioned at the left part of the subsidiary region SR and the (1-2) crack test lines MCDL1b positioned at the right part of the subsidiary region SR.

In addition, the resistance checker SGP may be disposed between the (1-3) crack test lines MCDL1c and the display area DA.

The display panel 100 may include output resistance test lines S_OL1 to S_OL4 and an input resistance test line S_IL connecting the resistance checker SGP with the resistance test pads S_OP and S_IP. Although there are one input resistance test pad S_IP and one input resistance test line S_IL and four output resistance test pads S_OP1 to S_OP4 and four output resistance test lines S_OL1 to S_OL4 in the example shown in FIG. 3, it is to be understood that the numbers are not limed thereto.

The second output resistance test pad S_OP2 may be disposed between the first output resistance test pad S_OP1 and the input resistance test pad S_IP, the input resistance test pad S_IP may be disposed between the second output resistance test pad S_OP2 and the third output resistance test pad S_OP3, and the third output resistance test pad S_OP3 may be disposed between the fourth output resistance test pad S_OP4 and the input resistance test pad S_IP.

The first output resistance test line S_OL1 may connect the first output resistance test pad S_OP1 with the resistance checker SGP, the second output resistance test line S_OL2 may connect the second output resistance test pad S_OP2 with the resistance checker SGP, the third output resistance test line S_OL3 may connect the third output resistance test pad S_OP3 with the resistance checker SGP, the fourth output resistance test line S_OL4 may connect the fourth output resistance test pad S_OP4 with the resistance checker SGP, and the input resistance test line S_IL may connect the input resistance test pad S_IP with the resistance checker SGP.

An input resistance test voltage may be applied from the driving member 350 of FIG. 1 through the input resistance test pad S_IP. The applied input resistance test voltage or first voltage may be supplied to the resistance checker SGP through the input resistance test pad S_IP. The input resistance test voltage supplied to the resistance checker SGP may be dropped by a predetermined level to be converted into the output resistance test voltage or the second voltage, and then may be applied to the output resistance test pads S_OP1 to S_OP4 through the output resistance test lines S_OL1 to S_OL4, respectively.

The resistance checker SGP may be disposed from the subsidiary region SR to the bending region BR. As will be described later, the resistance checker SGP may include a first resistance checker RGP1 (refer to FIG. 5) disposed in the subsidiary region SR and a second resistance checker RGP2 (refer to FIG. 5) disposed in the bending region BR. The input resistance test voltage supplied to the resistance checker SGP through the input resistance test pad S_IP may be provided to each of the resistance checkers RGP1 and RGP2. The first resistance checker RGP1 may check a resistance in the subsidiary region SR, and the second resistance checker RGP2 may check a resistance in the bending region BR. Typically, there may be a large change in the resistance in the bending region BR of a bendable display device. The resistance checker SGP in the exemplary embodiment of the invention includes the first resistance checker RGP1 disposed in the subsidiary region SR and the second resistance checker RGP2 disposed in the bending region BR, and accordingly it is possible to compare the output resistance test voltage output through the first resistance checker RGP1 with the output resistance test voltage output through the second resistance checker RGP2. By doing so, it is possible to accurately measure a change in the resistance occurring in the bending region BR.

The resistance test lines S_OL and S_IL connecting the resistance checker SGP with the resistance test pads S_OP and S_IP may intersect the first crack test lines MCDL1 in a plan view and may overlap with the first crack test lines MCDL1 in the thickness direction.

As will be described later, the first crack test lines MCDL1 may be provided as the first conductive layer or the second conductive layer, while the resistance test lines S_OL and S_IL may be provided as the third conductive layer or the fourth conductive layer. As the first crack test lines MCDL1 and the resistance test lines S_OL and S_IL intersect each other in a plan view and overlap each other in the thickness direction, there may be a disconnection due to external stress such as static electricity even though there is no physical contact. When any of the first crack test lines MCDL1 or the resistance test lines S_OL and S_IL is disconnected, it may not be possible to properly perform crack inspection or resistance measurement on the display device 1.

In this regard, in the exemplary embodiment of the display device 1, the resistance checker SGP is disposed further inside than the first crack test lines MCDL1, i.e., the first crack test lines MCDL1 are disposed further outside than the resistance checker MCDL1, so that the area where the first crack test lines MCDL1 and the resistance test lines S_OL and S_IL intersect in a plan view or overlap each other in the thickness direction may be greatly reduced.

The output resistance test lines S_OL1 to S_OL4 may intersect the (1-3) crack test lines MCDL1c, as shown in FIG. 3. The output resistance test lines S_OL1 to S_OL4 may overlap the (1-3) crack test lines MCDL1c in the thickness direction.

The output resistance test lines S_OL1 to S_OL4 intersect only the (1-3) crack test lines MCDL1c but not with the (1-2) crack test lines MCDL1b, so that the area where the first crack test lines MCDL1 and the resistance test lines S_OL and S_IL intersect each other in a plan view or overlap each other in the thickness direction may be greatly reduced.

In this manner, it is possible to prevent improper crack inspection or resistance measurement on the display device 1 due to a disconnection in any of the first crack test lines MCDL1 or the resistance test lines S_OL and S_IL.

As shown in FIG. 3, while the crack test pads MP are aligned with the edge EG of the display panel 100, the resistance test pads S_IP and S_OP may not be aligned with the edge EG of the display panel 100 but may be disposed inside the display panel 100. The display panel 100 may further include a cutting part further extended from the edge EG of the display panel 100 before a modularization process of attaching the PCB 300. The crack test pads MP may further include a pre-crack detector at the edge EG of the display panel 100 or in the cutting part further extended from the edge EG of the display panel 100. The pre-crack detector may be physically connected to the crack test pads MP and may be removed together with the cutting part when the cutting part is cut. Therefore, the ends of the crack test pads MP are aligned with the edge EG of the display panel 100. The resistance test pads S_IP and S_OP do not include a pre-resistance test pad disposed in the cutting part, and thus the ends of the resistance test pads S_IP and S_OP close to the edge EG of the display panel 100 may be spaced apart from the edge EG of the display panel 100 in the second direction DR2, instead of being aligned with the edge EG. That is to say, the ends of the resistance test pads S_IP and S_OP may be closer to the display area DA than the ends of the crack test pads MP are.

Figure 4:
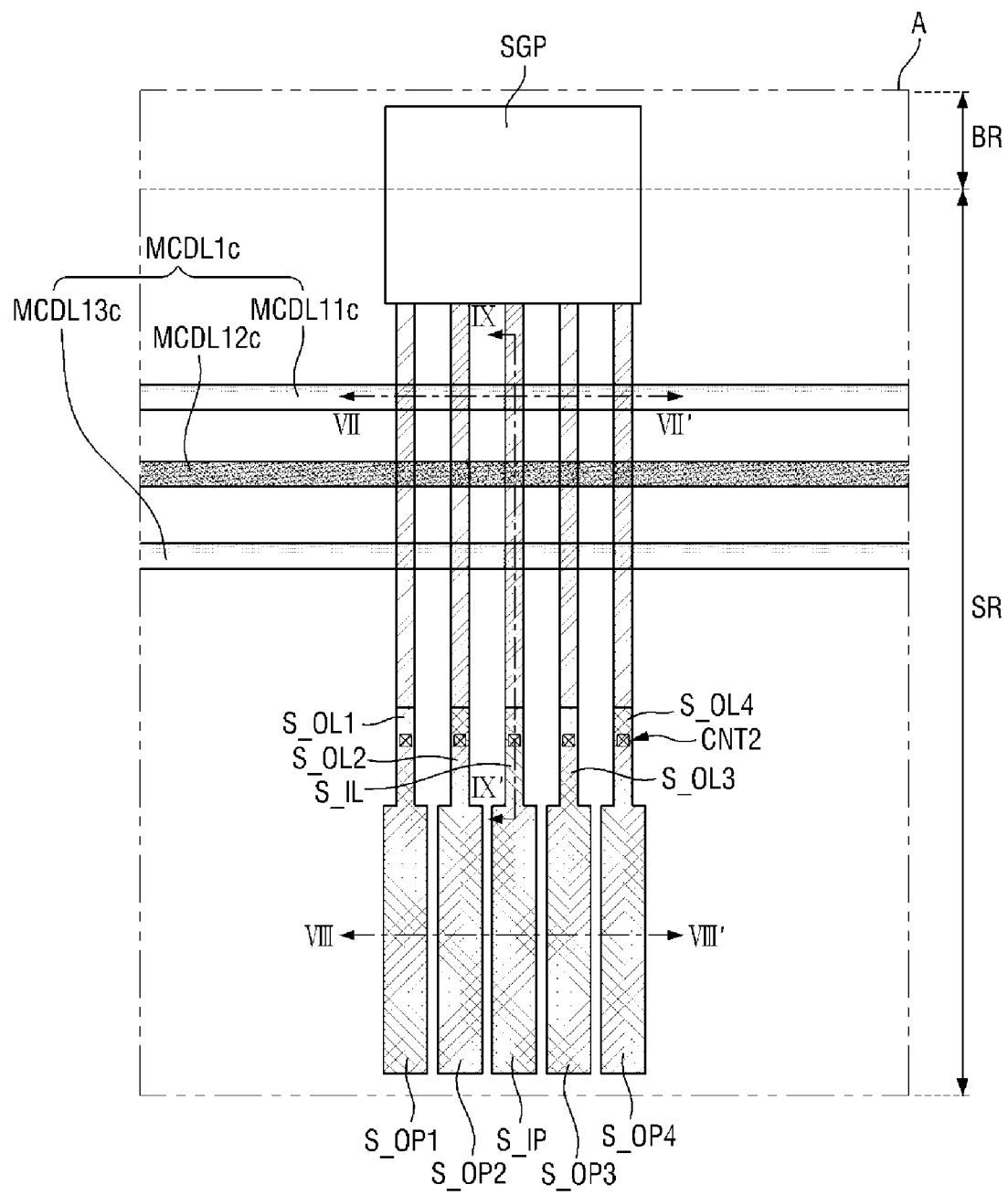
FIG. 4 is an enlarged plan view of area A of FIG. 3.
Figure 5:
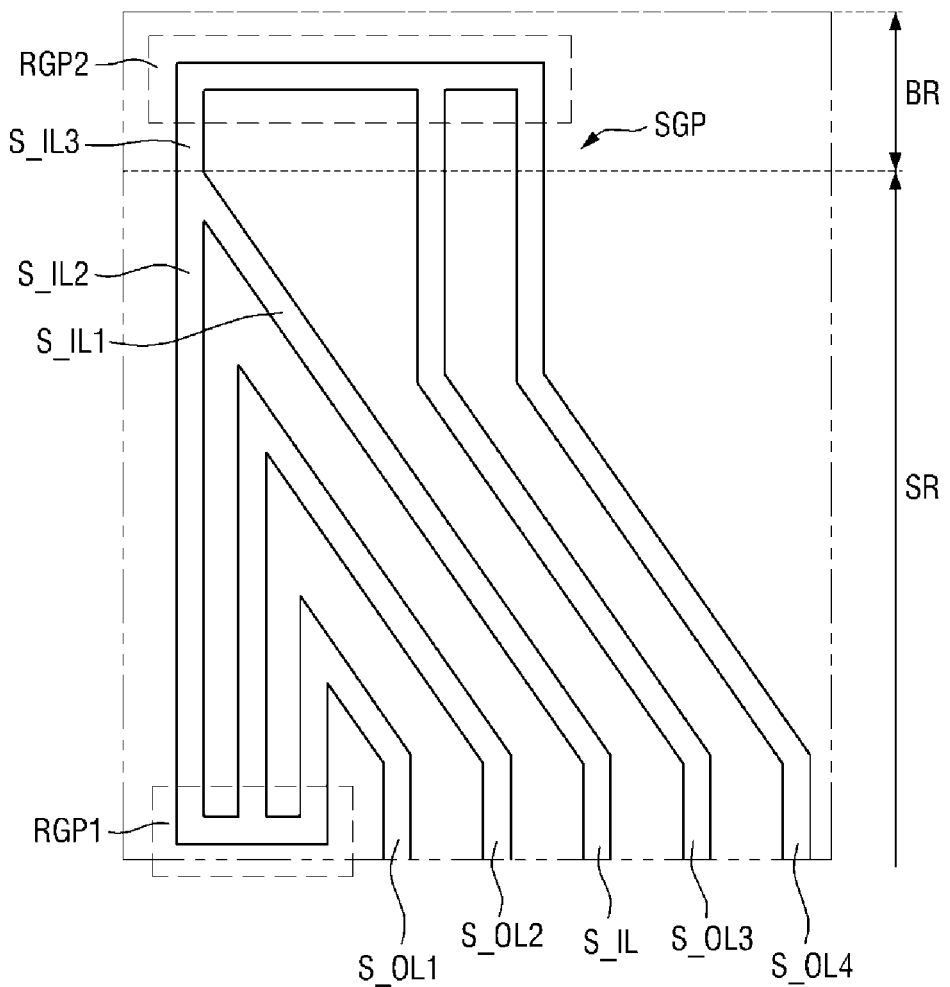
FIG. 5 is a view showing the resistance checker of FIG. 4.
Figure 6:
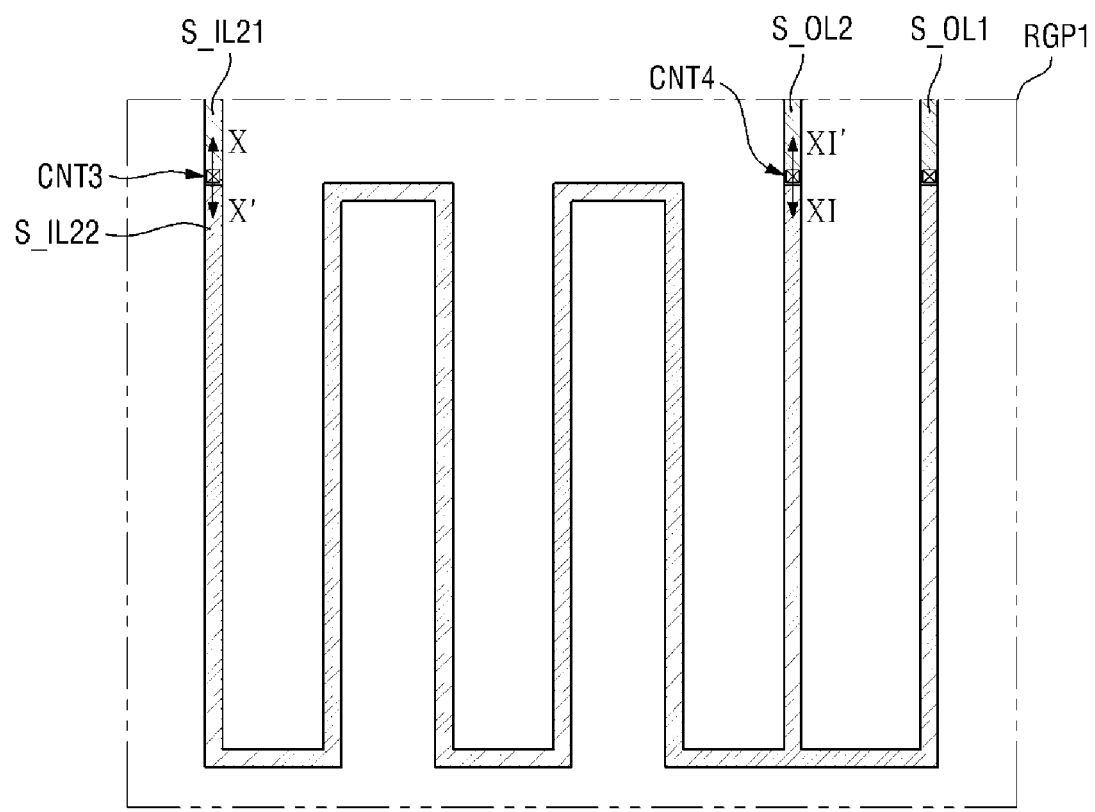
FIG. 6 is a view showing the first resistance checker of FIG. 5.
Figure 7:
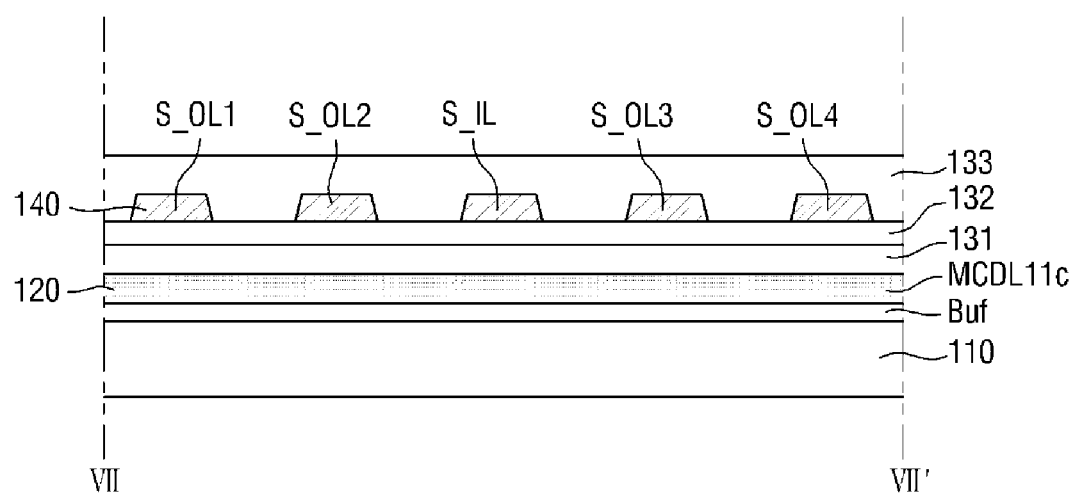
FIG. 7 is a cross-sectional view taken along line VII-VII' of FIG. 4.
Figure 8:
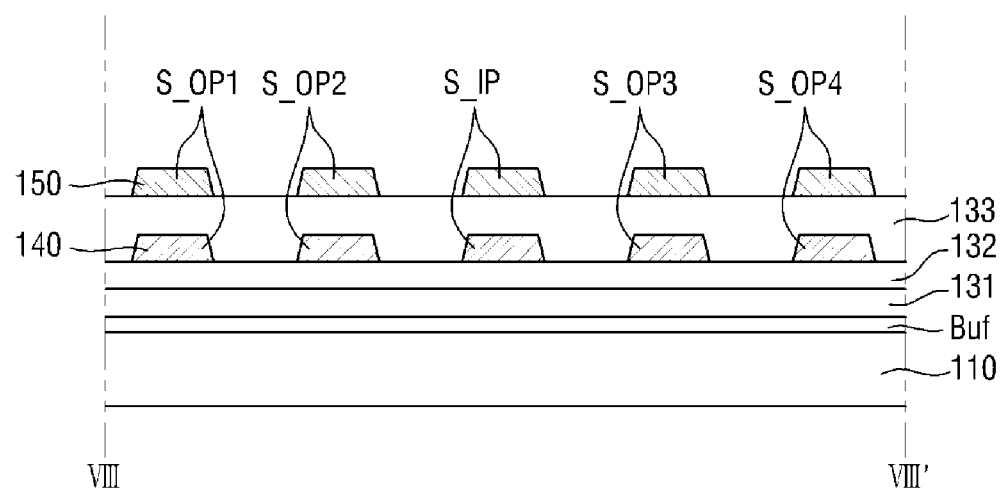
FIG. 8 is a cross-sectional view taken along line VIII-VIII' of FIG. 4.
Figure 9:
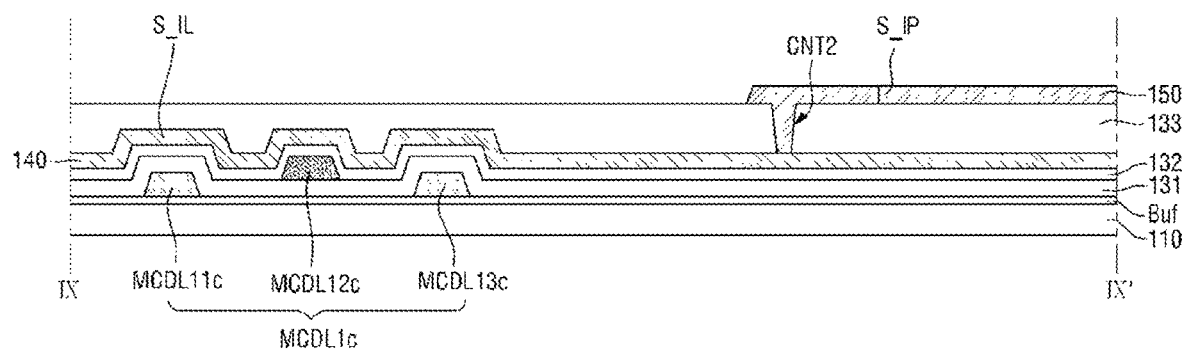
FIG. 9 is a cross-sectional view taken along line IX-IX' of FIG. 4.
Figure 10:
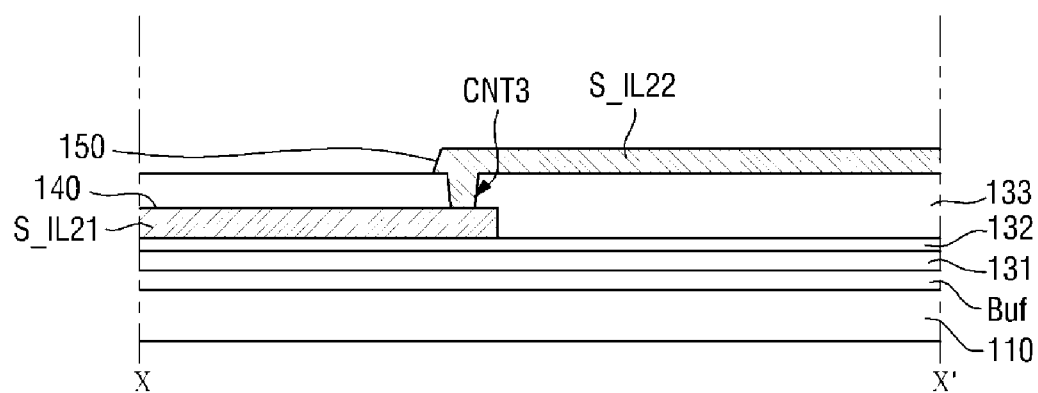
FIG. 10 is a cross-sectional view taken along line X-X' of FIG. 6.
Figure 11:
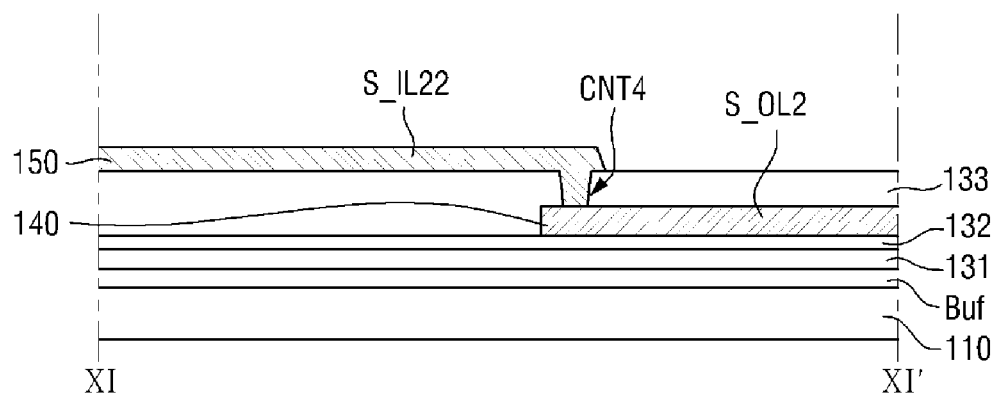
FIG. 11 is a cross-sectional view taken along line XI-XI' of FIG. 6.

FIG. 4 is an enlarged plan view of area A of FIG. 3. FIG. 5 is a view showing the resistance checker of FIG. 4. FIG. 6 is a view showing the first resistance checker of FIG. 5. FIG. 7 is a cross-sectional view taken along line VII-VII' of FIG. 4. FIG. 8 is a cross-sectional view taken along line VIII-VIII' of FIG. 4. FIG. 9 is a cross-sectional view taken along line IX-IX' of FIG. 4. FIG. 10 is a cross-sectional view taken along line X-X' of FIG. 6. FIG. 11 is a cross-sectional view taken along line XI-XI' of FIG. 6.

Referring to FIGS. 4 to 11, there may be three (1-3) crack test lines MCDL1c as described above. Specifically, the (1-3) crack test lines MCDL1c may include a (1-3-1) crack test line MCDL11c to a (1-3-3) crack test line MCDL13c. In an exemplary embodiment, the (1-3-1) crack test line MCDL11c to the (1-3-3) crack test lines MCDL13c may be arranged sequentially from the resistance checker SGP toward the resistance test pads S_OP and S_IP, for example. It is, however, to be understood that the invention is not limited thereto.

The (1-3) crack test line MCDL1c may pass between the resistance checker SGP and the resistance test pads S_OP and S_IP in a plan view.

The (1-3-1) crack test line MCDL11c to the (1-3-3) crack test line MCDL13c may be provided as the first conductive layer or the second conductive layer. In an exemplary embodiment, the (1-3-1) crack test line MCDL11c and the (1-3-3) crack test line MCDL13c may be provided as the first conductive layer, and the (1-3-2) crack test line MCDL12c may be provided as the second conductive layer, for example. It is, however, to be understood that the invention is not limited thereto. In another exemplary embodiment, the (1-3-1) crack test line MCDL11c and the (1-3-3) crack test line MCDL13c may be provided as the second conductive layer, and the (1-3-2) crack test line MCDL12c may be provided as the first conductive layer.

The resistance test pads S_OP1 to S_OP4 and S_IP may have a larger width than a width of the resistance test lines S_OL1 to S_OL4 and S_IL in a plan view. As shown in FIG. 4, the resistance test pads S_OP1 to S_OP4 and S_IP may have a larger width than a width of the resistance test lines S_OL1 to S_OL4 and S_IL in the first direction DR1 in a plan view.

The output resistance test lines S_OL1 to S_OL4 may be physically connected to the output resistance test pads S_OP1 to S_OP4, respectively, and the input resistance test line S_IL may be physically connected to the input resistance test pad S_IP.

Specifically, the first output resistance test line S_OL1 may be physically connected to the first output resistance test pad S_OP1, the second output resistance test line S_OL2 may be physically connected to the second output resistance test pad S_OP2, the third output resistance test line S_OL3 may be physically connected to the third output resistance test pad S_OP3, the fourth output resistance test line S_OL4 may be physically connected to the fourth output resistance test pad S_OP4, and the input resistance test line S_IL may be physically connected to the input resistance test pad S_IP.

The resistance test pads S_OP1 to S_OP4 and S_IP may be provided as the third conductive layer and the fourth conductive layer, and the resistance test lines S_OL1 to S_OL4 and S_IL connected to the resistance test pads S_OP1 to S_OP4 and S_IP, respectively, may be provided as the third conductive layer and the fourth conductive layer and only the third conductive layer 140 not the fourth conductive layer may be extended to be connected to the resistance checker SGP.

As shown in FIG. 4, the third conductive layer and the fourth conductive layer may be electrically connected to each other through the second contact holes CNT2. Although only the second contact holes CNT2 are depicted in the drawings, the number of contact holes is not limited thereto.

Referring to FIG. 5, the resistance checker SGP may include a first resistance checker RGP1 disposed in the subsidiary region SR and a second resistance checker RGP2 disposed in the bending region BR. The input resistance test line S_IL may include three separate parts. In an exemplary embodiment, the input resistance test line S_IL may include a first input resistance test line S_IL1 connected to the input resistance test line S_IL in FIG. 4, and input resistance test lines S_IL2 and S_IL3 branching off from the first input resistance test line S_IL1, for example. The first input resistance test line S_IL1 may be extended in a direction between the first direction DR1 and the second direction DR2 and may be divided into two branches. The branched second input resistance test line S_IL2 may be connected to the first resistance checker RGP1, and the branched third input resistance test line S_IL3 may be connected to the second resistance checker RGP2.

The output resistance test lines S_OL1 and S_OL2 may be connected to the first resistance checker RGP1, and the output resistance test lines S_OL3 and S_OL4 may be connected to the second resistance checker RGP2.

FIG. 6 is a plan view showing the first resistance checker RGP1 in more detail. The shape of the second resistance checker RGP2 in a plan view is substantially the same as that of the first resistance checker RGP1, and, therefore, the redundant description will be omitted.

The second input resistance test line S_IL2 may include a (2-1) input resistance test line S_IL21 and a (2-2) input resistance test line S_IL22. The (2-1) input resistance test line S_IL21 may be connected to the first input resistance test line S_IL1, and the (2-2) input resistance test line S_IL22 may be connected to each of the output resistance test lines S_OL1 and S_OL2. The (2-2) input resistance test line S_IL22 may include at least one bent portion as shown in FIG. 6.

The (2-1) input resistance test line S_IL21 may be provided as the third conductive layer 140, and the (2-2) input resistance test line S_IL22 may be provided as the fourth conductive layer 150. The (2-1) input resistance test line S_IL21 and the (2-2) input resistance test line S_IL22 may be electrically connected to each other through a third contact hole CNT3.

The resistance test lines S_OL1 and S_OL2 connected to the resistance checker SGP may be provided as the fourth conductive layer 150 as described above. The resistance test lines S_OL1 and S_OL2 connected to the resistance checker SGP and the (2-2) input resistance test line S_IL22 may be electrically connected to each other through a fourth contact hole CNT4.

Referring to FIGS. 7 to 8, the display panel may include a base substrate 110, a buffer layer Buf disposed on the base substrate 110, a first conductive layer 120 disposed on the buffer layer Buf, a first insulating layer 131 disposed on the first conductive layer 120, a second insulating layer 132 disposed on the first insulating layer 131, a third conductive layer 140 disposed on the second insulating layer 132, a third insulating layer 133 disposed on the third conductive layer 140, and a fourth conductive layer 150 disposed on the third insulating layer 133.

The base substrate 110 supports a variety of layers disposed thereon. The base substrate 110 may be disposed across the display area DA and the non-display area NDA. The base substrate 110 may include an insulating material such as a polymer resin. Examples of the polymer material may include polyethersulphone ("PES"), polyacrylate ("PA"), polyacrylate ("PAR"), polyetherimide ("PEI"), polyethylene naphthalate ("PEN"), polyethylene terephthalate ("PET"), polyphenylene sulfide ("PPS"), polyallylate, polyimide polycarbonate ("PC"), cellulose triacetate ("CAT"), cellulose acetate propionate ("CAP") or a combination thereof. The base substrate 110 may be a flexible substrate that may be bent, folded, or rolled. An example of the material of the flexible substrate may be, but is not limited to, polyimide ("PI"). The base substrate 110 may be a rigid substrate including at least one of glass, quartz, etc., for example.

The buffer layer Buf may be disposed on the base substrate 110. The buffer layer Buf may prevent impurity ions from diffusing, may prevent permeation of moisture or outside air, and may provide a flat surface. In an exemplary embodiment, the buffer layer Buf may include silicon nitride, silicon oxide, silicon oxynitride, or the like, for example.

The first conductive layer 120 may include the above-described (1-3-1) crack test line MCDL11c.

Each of the first insulating layer 131 and the second insulating layer 132 may include at least one of a silicon combination, a metal oxide, etc., for example. In an exemplary embodiment, each of the first insulating layer 131 and the second insulating layer 132 may include at least one of silicon oxide, silicon nitride, silicon oxynitride, aluminum oxide, tantalum oxide, hafnium oxide, zirconium oxide, titanium oxide, etc., for example. They may be used alone or in combinations. Although the first insulating layer 131 and the second insulating layer 132 are provided as a single layer in the drawings, the first insulating layer 131 and the second insulating layer 132 may be provided as multiple layers of different materials in some implementations.

The third conductive layer 140 may be disposed on the second insulating layer 132. A plurality of resistance test lines S_OL1 to S_OL4 and S_IL spaced apart from one another may be disposed in the third conductive layer 140.

In an exemplary embodiment, the third conductive layer 140 may include at least one metal including at least one of aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu) and molybdenum (Mo). As shown in the drawings, the third conductive layer 140 may be a single layer. It is, however, to be understood that the invention is not limited thereto. The third conductive layer 140 may include multiple layers. In an exemplary embodiment, the third conductive layer 140 may have a stack structure of Ti/Al/Ti, Mo/Al/Mo, Mo/AlGe/Mo, Ti/Cu, etc., for example.

The third insulating layer 133 may be disposed on the third conductive layer 140. The third insulating layer 133 may include the above-listed materials of the first insulating layer 131. In some exemplary embodiments, the third insulating layer 133 may include an organic insulating material. Examples of the organic insulating material may include, but is not limited to, at least one of polyacrylate resin, epoxy resin, phenolic resin, polyamide resin, polyimide resin, unsaturated polyesters resin, polyphenylene ether resin, polyphenylene sulfide resin, benzocyclobutene ("BCB"), etc.

The fourth conductive layer 150 may be disposed on the third insulating layer 133.

The resistance test pads S_OP1 to S_OP4 and S_IP spaced apart from one another may be disposed in the fourth conductive layer 150.

In an exemplary embodiment, the fourth conductive layer 150 may include at least one metal including at least one of aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu) and molybdenum (Mo), for example. As shown in the drawings, the fourth conductive layer 150 may be a single layer. It is, however, to be understood that the invention is not limited thereto. The fourth conductive layer 150 may include multiple layers. In an exemplary embodiment, the fourth conductive layer 150 may have a stack structure of Ti/Al/Ti, Mo/Al/Mo, Mo/AlGe/Mo, Ti/Cu, etc., for example.

Referring to FIG. 9, the first conductive layer may include a (1-3-1) crack test line MCDL11c and a (1-3-3) crack test line MCDL13c, and the second conductive layer may include a (1-3-2) crack test line MCDL12c. As described above, the crack test lines MCDL may include the lines disposed in the first conductive layer and the lines disposed in the second conductive layer which are arranged alternately.

The third conductive layer 140 on the second insulating layer 132 and the fourth conductive layer 150 may include the input resistance test line S_IL. As described above, the third conductive layer 140 of the input resistance test line S_IL may be extended alone toward the input resistance test pad S_IP until it reaches a position, and then the third conductive layer 140 and the fourth conductive layer 150 may be extended together from the position. At the position, the input resistance test lines S_IL of the third conductive layer 140 and the fourth conductive layer 150 may be electrically connected to each other through the second contact hole CNT2.

The input resistance test line S_IL of the fourth conductive layer 150 may be connected to the input resistance test pad S_IP of the fourth conductive layer 150, and the input resistance test line S_IL of the third conductive layer 140 may be connected to the input resistance test pad S_IP of the third conductive layer 140.

Referring to FIG. 10, the third conductive layer 140 may include the (2-1) input resistance test line S_IL21, and the fourth conductive layer 150 may include the (2-2) input resistance test line S_IL22. The (2-1) input resistance test line S_IL21 and the (2-2) input resistance test line S_IL22 may be electrically connected to each other through a third contact hole CNT3.

Referring to FIG. 11, the third conductive layer 140 may include the second output resistance test line S_OL2, and the fourth conductive layer 150 may include the (2-2) input resistance test line S_IL22. The second output resistance test line S_OL2 and the (2-2) input resistance test line S_IL22 may be electrically connected to each other through a fourth contact hole CNT4.

It is, however, to be understood that the stack structure of the resistance test pads S_OP1 to S_OP4 and S_IP and the resistance test lines S_OL1 to S_OL4 and S_IL is not limited to those described above.

In some exemplary embodiments, the resistance test pads S_OP1 to S_OP4 and S_IP and the resistance test lines S_OL1 to S_OL4 and S_IL may be provided as only one of the third conductive layer and the fourth conductive layer. The resistance test pads S_OP1 to S_OP4 and S_IP and the resistance test lines S_OL1 to S_OL4 and S_IL may be provided as only the third conductive layer, and the resistance test pads S_OP1 to S_OP4 and S_IP and the resistance test lines S_OL1 to S_OL4 and S_IL may be provided as only the fourth conductive layer.

In addition, the crack test lines MCDL may be provided as only the first conductive layer or only the second conductive layer, instead of lines formed as the first conductive layer and lines formed as second conductive layer alternately arranged.

As described above, the first crack test lines MCDL1 may be provided as the first conductive layer or the second conductive layer, while the resistance test lines S_OL and S_IL may be provided as the third conductive layer or the fourth conductive layer. As the first crack test lines MCDL1 and the resistance test lines S_OL and S_IL intersect each other in a plan view and overlap each other in the thickness direction, there may be a disconnection due to external stress such as static electricity even though there is no physical contact. When any of the first crack test lines MCDL1 or the resistance test lines S_OL and S_IL is disconnected, it may not be possible to properly perform crack inspection or resistance inspection on the display device 1.

In contrast, in the exemplary embodiment of the display device 1, the resistance checker SGP is disposed further inside than the first crack test line MCDL1, and thus the area where the first crack test lines MCDL1 and the resistance test lines S_OL intersect each other in a plan view or overlap each other in the thickness direction may be greatly reduced.

The output resistance test lines S_OL1 to S_OL4 may intersect the (1-3) crack test lines MCDL1c, as shown in FIG. 3. The output resistance test lines S_OL1 to S_OL4 may overlap the (1-3) crack test lines MCDL1c in the thickness direction.

The output resistance test lines S_OL1 to S_OL4 intersect only the (1-3) crack test lines MCDL1c but not with the (1-2) crack test lines MCDL1b, so that the area where the first crack test lines MCDL1 and the resistance test lines S_OL and S_IL intersect each other in a plan view or overlap each other in the thickness direction may be greatly reduced. In this manner, it is possible to prevent improper crack inspection or resistance measurement on the display device 1 due to a disconnection in any of the first crack test lines MCDL1 or the resistance test lines S_OL and S_IL.

Figure 12:
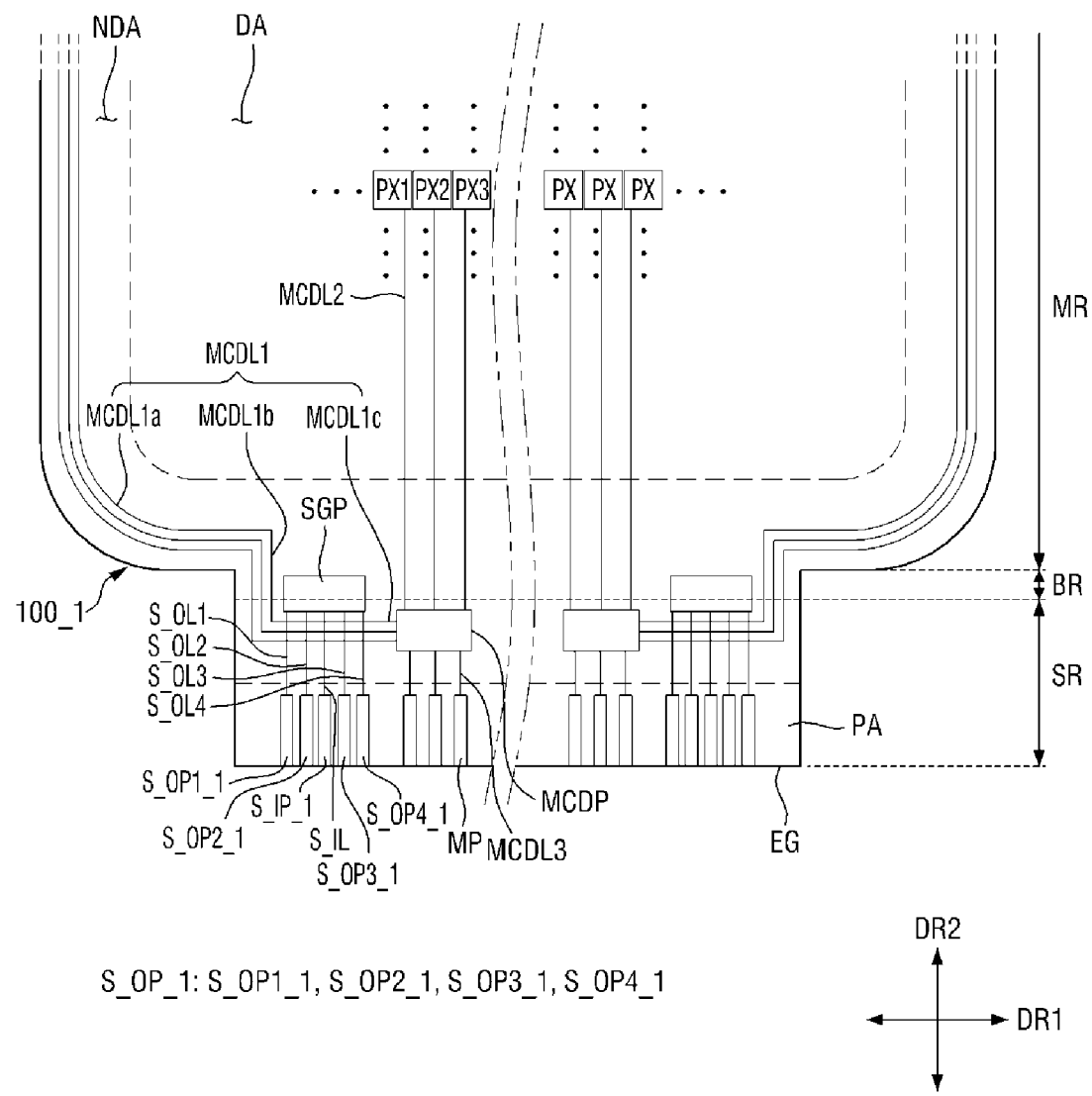
FIG. 12 is an enlarged plan view showing another exemplary embodiment of a layout of a display device according to the invention.
Figure 13:
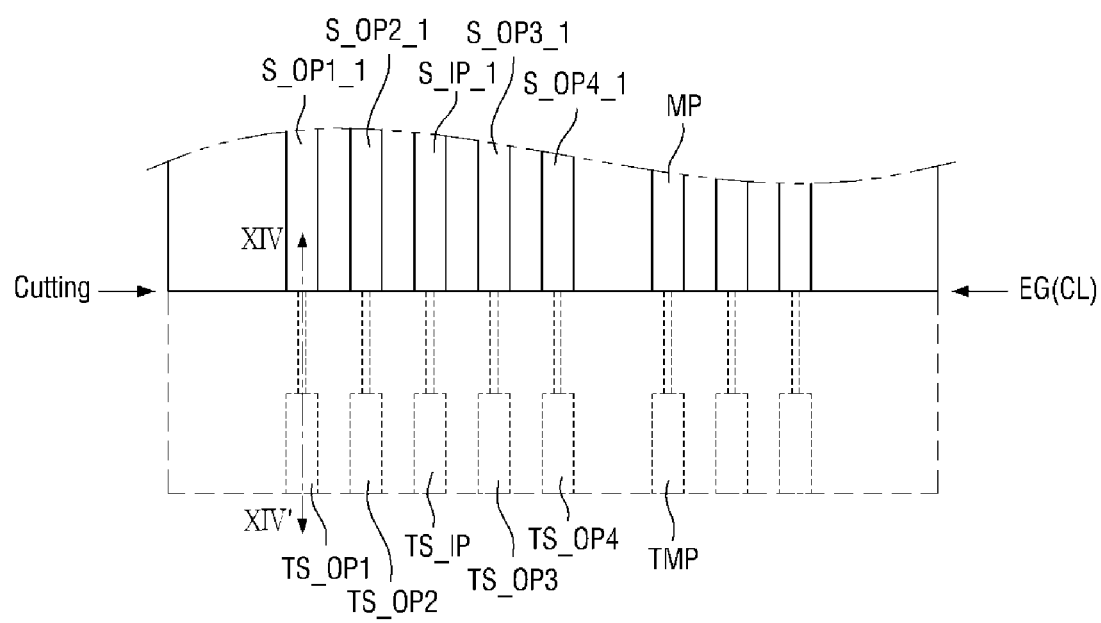
FIG. 13 is an enlarged view showing a part of FIG. 12.
Figure 14:
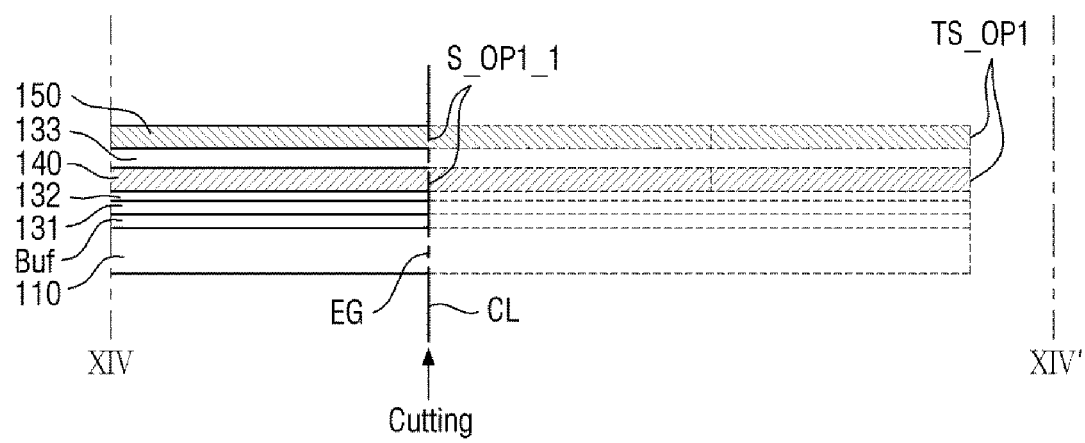
FIG. 14 is a cross-sectional view taken along line XIV-XIV' of FIG. 13.

FIG. 12 is an enlarged plan view showing another exemplary embodiment of a layout of a display device according to the invention. FIG. 13 is an enlarged view showing a part of FIG. 12. FIG. 14 is a cross-sectional view taken along line XIV-XIV' of FIG. 13.

A display panel 100_1 in the exemplary embodiment shown in FIGS. 12 to 14 is different from the display panel 100 in the exemplary embodiment of FIG. 3 in that resistance test pads S_OP1_1 to S_OP4_1 and S_IP_1 are aligned with the edge EG of the display panel 100_1.

More specifically, the resistance test pads S_IP_1 and S_OP_1 of the display panel 100_1 in this exemplary embodiment may be aligned with the end EG and crack test pads MP.

That is to say, the display panel 100_1 in this exemplary embodiment may further include a cutting part extended further from the edge EG of the display panel 100 before a modularization process of attaching the PCB 300. The crack test pads MP may further include a pre-crack detector further extended from the edge EG of the display panel 100 to include a pre-crack test pad TMP in the cutting part. The pre-crack detector may be physically connected to the crack test pad MP and then may be removed together with the cutting part when the cutting part is cut along a cutting line CL. Therefore, the crack test pads MP are aligned with the edge EG of the display panel 100_1. Similarly, the pre-resistance checker may include pre-resistance test pads TS_OP1 to TS_OP4 and TS_IP disposed in the cutting part. The pre-resistance checker may be physically connected to the resistance test pads S_IP_1 and S_OP_1, and may be removed together with the cutting part when the cutting part is cut. Therefore, the resistance test pads S_IP_1 and S_OP_1 are aligned with the edge EG of the display panel 100_1.

The display panel 100_1 in this exemplary embodiment may further include the cutting part extended further from the end EG of the display panel 100 before a modularization process and the pre-resistance checker is disposed in the cutting part, so that it is possible to inspect whether there is a disconnection in the resistance lines S_OL and S_IL before the modularization process of attaching the PCB 300.

Figure 15:
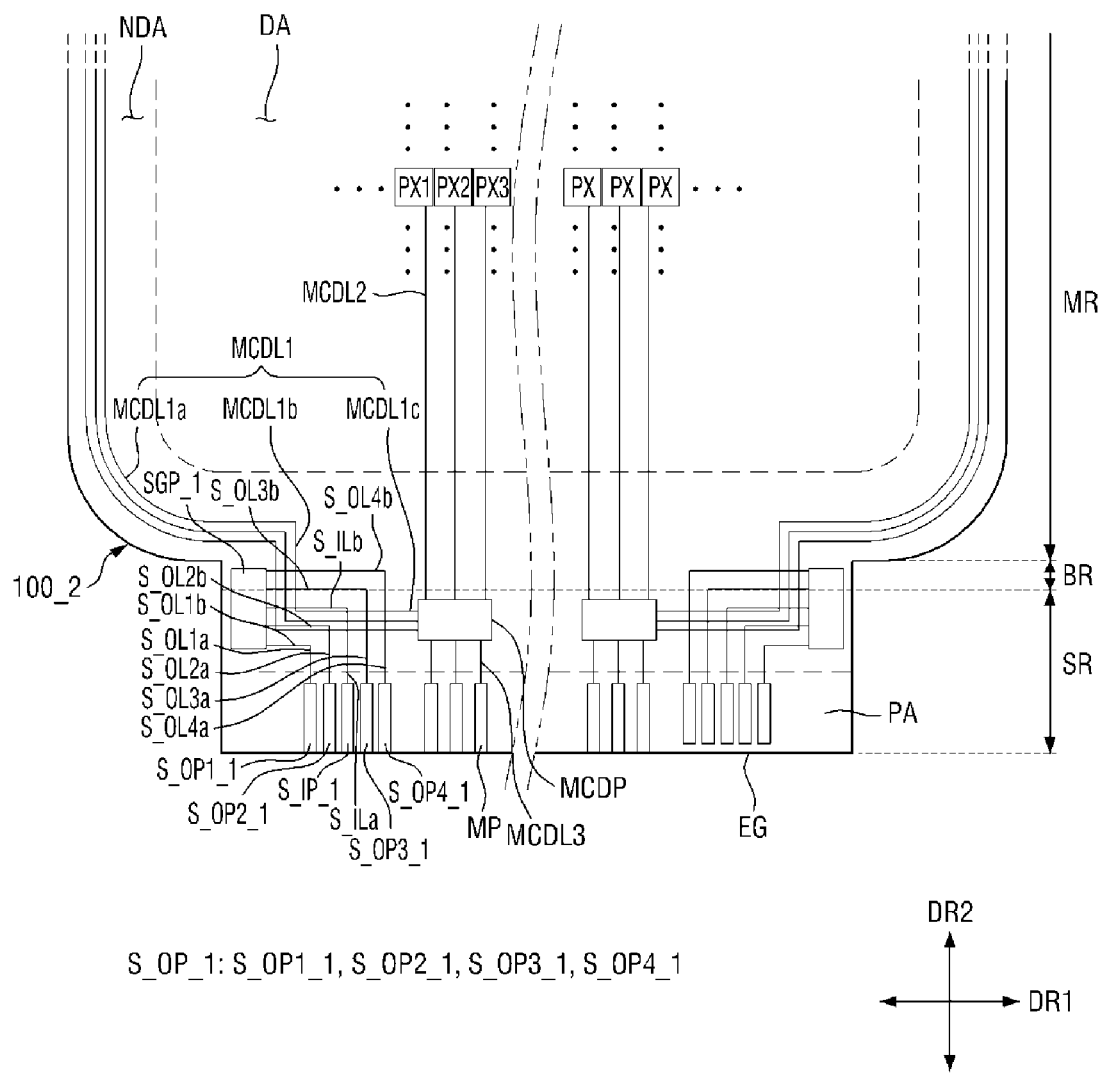
FIG. 15 is an enlarged plan view showing another exemplary embodiment of a display device according to the invention.
Figure 16:
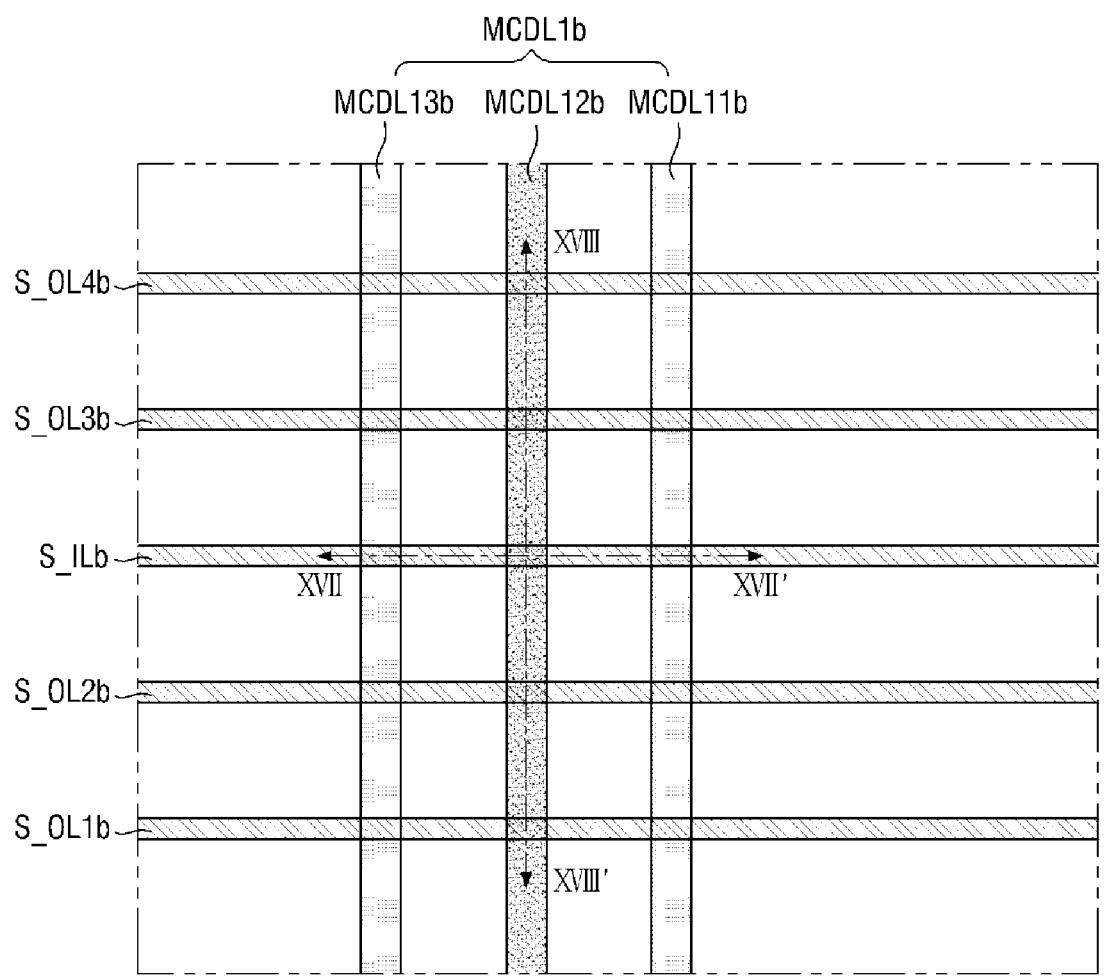
FIG. 16 is an enlarged view showing a part of FIG. 15.
Figure 17:
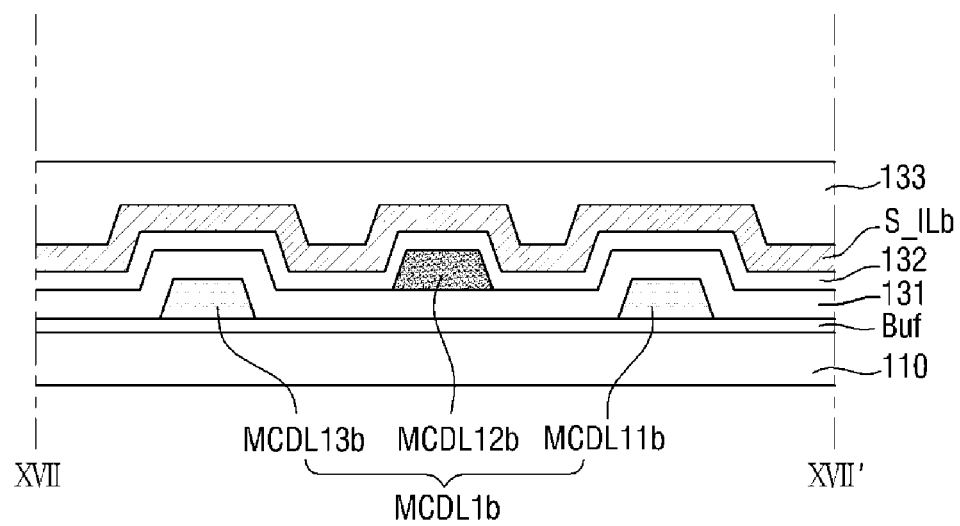
FIG. 17 is a cross-sectional view taken along line XVII-XVII' of FIG. 16.
Figure 18:
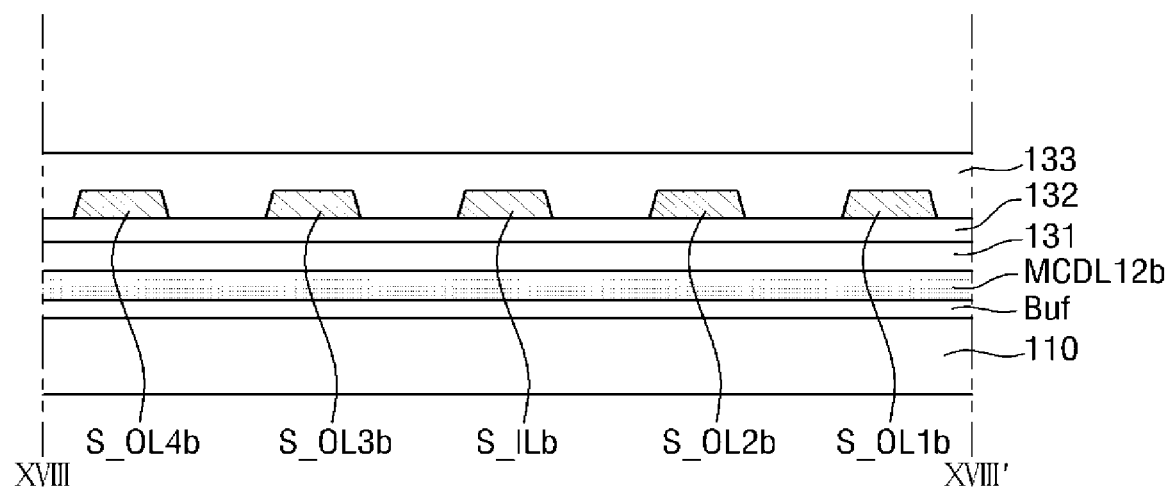
FIG. 18 is a cross-sectional view taken along line XVIII-XVIII' of FIG. 16.

FIG. 15 is an enlarged plan view showing another exemplary embodiment of a layout of a display device according to the invention. FIG. 16 is an enlarged view showing a part of FIG. 15. FIG. 17 is a cross-sectional view taken along line XVII-XVII' of FIG. 16. FIG. 18 is a cross-sectional view taken along line XVIII-XVIII' of FIG. 16.

A display panel 100 2 in the exemplary embodiment of FIGS. 15 to 18 is different from the display panel 100_1 of FIG. 12 in that a resistance checker SGP_1 is disposed further outside than crack test lines MCDL1.

More specifically, referring to FIGS. 13 and 14, the pre-resistance checker may include pre-resistance test pads TS_OP1 to TS_OP4 and TS_IP disposed in the cutting part. The pre-resistance checker may be physically connected to the resistance test pads S_IP_1 and S_OP_1, and may be removed together with the cutting part when the cutting part is cut. Therefore, the resistance test pads S_IP_1 and S_OP_1 are aligned with the end EG of the display panel 100_1.

The display panel 100_2 in this exemplary embodiment may further include the cutting part extended further from the edge EG of the display panel 100_2 before a modularization process and the pre-resistance checker is disposed in the cutting part, so that it is possible to inspect whether there is a disconnection in the resistance lines S_OL and S_IL before the modularization process of attaching the PCB 300.

1a resistance test lines S_OL1a to S_OL4a and S_ILa may be connected to the resistance test pads S_IP_1 and S_OP_1, and 1b resistance test lines S_OL1b to S_OL4b and S_ILb may connect the 1a resistance test lines S_OL1a to S_OL4a and S_ILa with the resistance checker SGP_1.

The 1a resistance test lines S_OL1a to S_OL4a and S_ILa may be extended in the second direction DR2, and the 1b resistance test lines S_OL1b to S_OL4b and S_ILb may be extended in the first direction DR1.

The 1a resistance test lines S_OL1a to S_OL4a and S_ILa may intersect and overlap the (1-3) crack test line MCDL1c in a plan view, and the 1b resistance test lines S_OL1b to S_OL4b and S_ILb may intersect and overlap the (1-2) crack test lines MCDL1b including a (1-2-1) crack test line MCDL11b to a (1-2-3) crack test line MCDL13b in a plan view.

Figure 19:
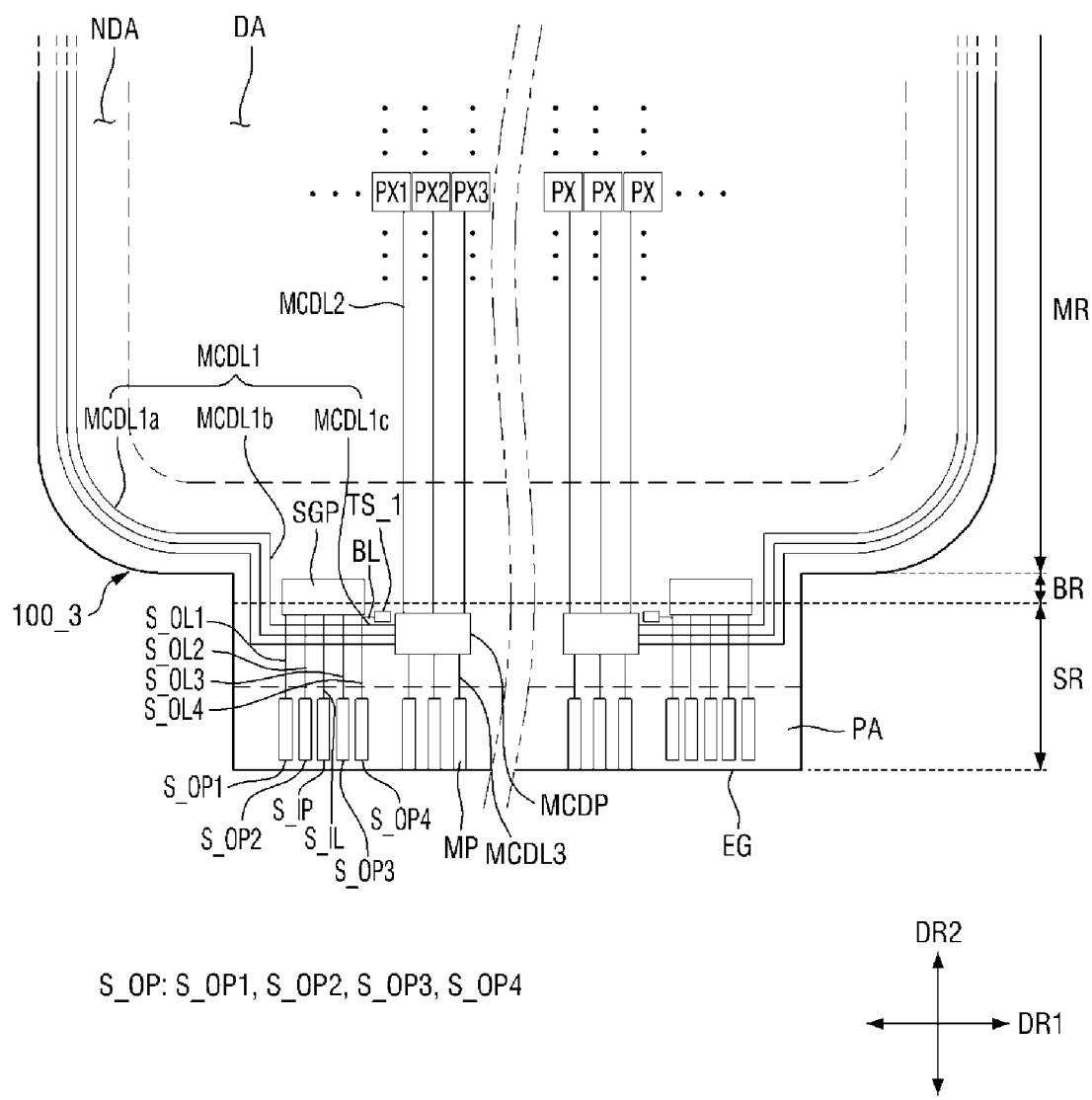
FIG. 19 is an enlarged plan view showing another exemplary embodiment of a display device according to the invention.

FIG. 19 is an enlarged plan view showing another exemplary embodiment of a display device according to the invention.

A display panel 100_3 in the exemplary embodiment of FIG. 19 is different from the display panel 100 of FIG. 3 in that the display panel 100_3 further includes a pre-test pad TS_1.

More specifically, the display panel 100_3 in this exemplary embodiment may further include the pre-test pad TS_1. The pre-test pad TS__1 may be connected to a connection line BL branching off from the resistance test lines S_OL1 to S_OL4 and S_IL. The connection line BL may branch off from the resistance test lines S_OL1 to S_OL4 and S_IL on their inner side. Therefore, the pre-test pad TS_1 may be disposed on the inner side of the resistance test lines S_OL1 to S_OL4 and S_IL. In other words, the pre-test pad TS_1 may be closer to a line that is extended in the second direction DR2 and equally divides the display panel 100_3 in the first direction DR1 than the resistance test lines S_OL1 to S_OL4 are.

Although only one connection line BL and one pre-test pad TS_1 are shown in FIG. 19, there may be a plurality of connection lines BL branching off from the resistance test lines S_OL1 to S_OL4 and S_IL, respectively.

Also in the exemplary embodiment of the invention, the display panel 100_3 further includes the pre-test pad TS_1 so that it is possible to inspect whether there is a disconnection in the resistance test lines S_OL and S_IL before the modularization process of attaching the PCB 300.

In addition, in the exemplary embodiment of the display panel 100_3, the resistance checker SGP is disposed further inside than the first crack test line MCDL1, and thus the area where the first crack test lines MCDL1 and the resistance test lines S_OL intersect each other in a plan view or overlap each other in the thickness direction may be greatly reduced.

The output resistance test lines S_OL1 to S_OL4 may intersect the (1-3) crack test line MCDL1c. The output resistance test lines S_OL1 to S_OL4 may overlap the (1-3) crack test lines MCDL1c in the thickness direction.

The output resistance test lines S_OL1 to S_OL4 intersect only the (1-3) crack test lines MCDL1c but not with the (1-2) crack test lines MCDL1b, so that the area where the first crack test lines MCDL1 and the resistance test lines S_OL and S_IL intersect each other in a plan view or overlap each other in the thickness direction may be greatly reduced. In this manner, it is possible to prevent improper crack inspection or resistance measurement on the display device due to a disconnection in any of the first crack test lines MCDL1 or the resistance test lines S_OL and S_IL.

Figure 20:
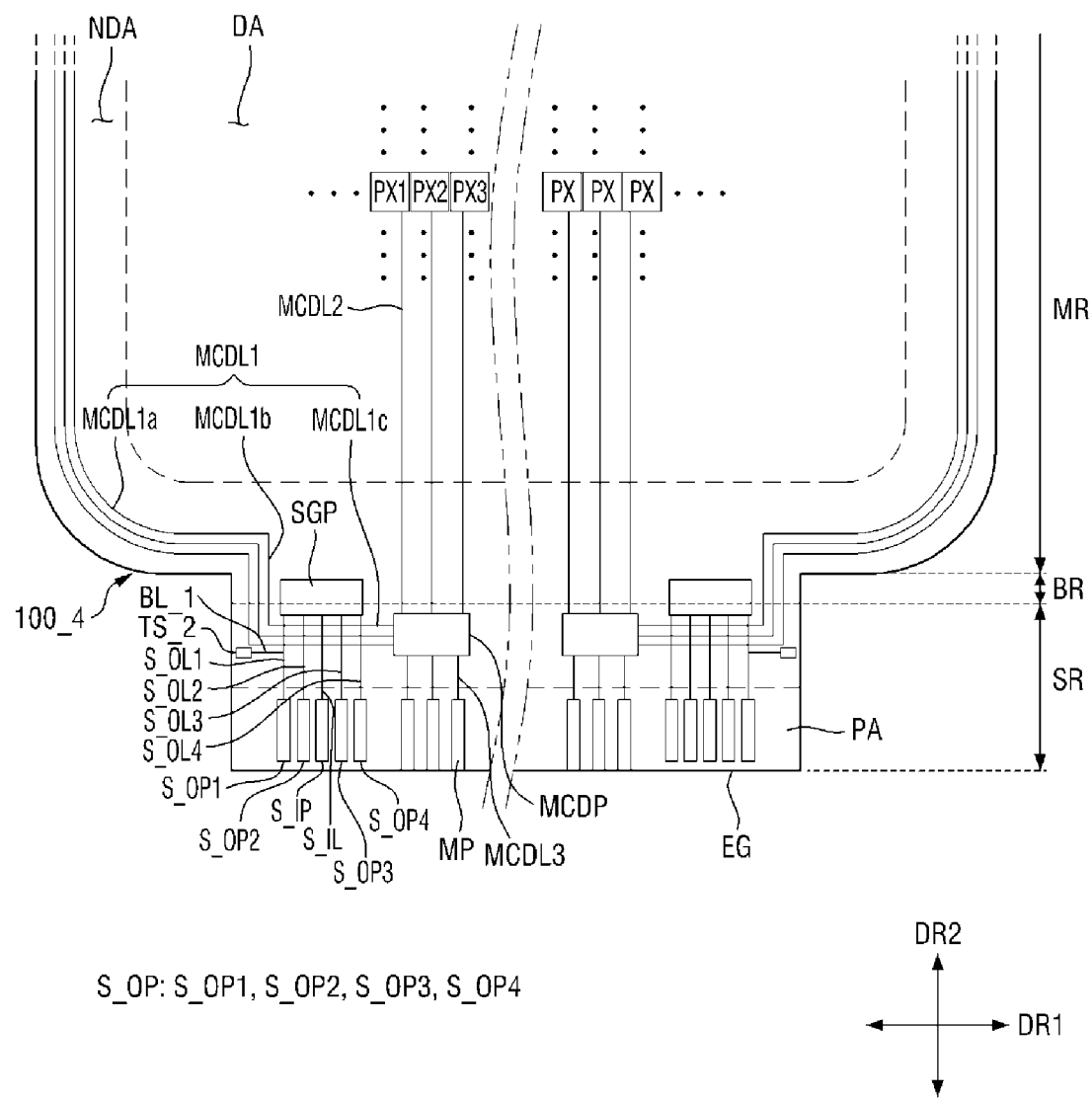
FIG. 20 is an enlarged plan view showing another exemplary embodiment of the layout of a display device according to the invention.

FIG. 20 is an enlarged plan view showing another exemplary embodiment of the layout of a display device according to the invention.

In a display panel 100_4 in the exemplary embodiment of FIG. 20, a pre-test pad TS_2 may be connected to a connection line BL_1 branching off from the resistance test lines S_OL1 to S_OL4 and S_IL. The connection line BL_1 may branch off from the resistance test lines S_OL1 to S_OL4 and S_IL on their outer side. Therefore, the pre-test pad TS_2 may be disposed on the outer side of the resistance test lines S_OL1 to S_OL4 and S_IL.

Although only one connection line BL_1 and one pre-test pad TS_2 are shown in FIG. 20, there may be a plurality of connection lines BL_1 branching off from the resistance test lines S_OL1 to S_OL4 and S_IL, respectively.

Also in the exemplary embodiment of the invention, the display panel 100_4 further includes the pre-test pad TS_2 so that it is possible to inspect whether there is a disconnection in the resistance test lines S_OL and S_IL before the modularization process of attaching the PCB 300.

In addition, in the exemplary embodiment of the display panel 100_4, the resistance checker SGP is disposed further inside than the first crack test line MCDL1, and thus the area where the first crack test lines MCDL1 and the resistance test lines S_OL intersect each other in a plan view or overlap each other in the thickness direction may be greatly reduced.

The output resistance test lines S_OL1 to S_OL4 may intersect the (1-3) crack test line MCDL1c. The output resistance test lines S_OL1 to S_OL4 may overlap the (1-3) crack test lines MCDL1c in the thickness direction.

The output resistance test lines S_OL1 to S_OL4 intersect only the (1-3) crack test lines MCDL1c but not with the (1-2) crack test lines MCDL1b, so that the area where the first crack test lines MCDL1 and the resistance test lines S_OL and S_IL intersect each other in a plan view or overlap each other in the thickness direction may be greatly reduced.

In this manner, it is possible to prevent improper crack inspection or resistance measurement on the display device due to a disconnection in any of the first crack test lines MCDL1 or the resistance test lines S_OL and S_IL.

In some exemplary embodiments, the pre-test pad TS_2 may not be disposed in the display panel 100_4 but may be disposed in the cutting part before cutting the display panel 100_4. The cutting part may include, but is not limited to, a test element group ("TEG") part.

Although the exemplary embodiments of the invention have been described with reference to the accompanying drawings, those skilled in the art would understand that various modifications and alterations may be made without departing from the technical idea or essential features of the invention. Therefore, it should be understood that the above-mentioned embodiments are not limiting but illustrative in all features.

What is claimed is:

1. A display device comprising:
a display area and a non-display area disposed around the display area and comprising a pad area,
a resistance checker disposed in the non-display area;
resistance test pads disposed in the pad area;
resistance test lines connecting the resistance checker with the resistance test pads;
a crack detector disposed in the non-display area and connected to crack test lines passing between the resistance checker and the resistance test pads,
wherein the resistance test lines intersect the crack test lines in a plan view, and
wherein an outermost side of the crack detector is disposed inside than an outermost side of the resistance checker in a first direction intersecting a second direction in which the display area and the pad area are arranged, and
the outermost side of the crack detector and the outermost side of the resistance checker mainly extend in the second direction, and
wherein an entirety of the resistance test lines from the resistance checker to the resistance test pads only extend in the second direction and do not overlap the display area in the first direction.

2. The display device of claim 1, further comprising:
crack test pads disposed in the pad area and connected to the crack detector.

3. The display device of claim 2, wherein one end of each of the crack test pads is aligned with an edge of the display device while one end of each of the resistance test pads is spaced apart from the edge of the display device in the second direction, and
wherein the end of each of the resistance test pads is closer to the display area than the end of each of the crack test pads is.

4. The display device of claim 2, wherein the crack test lines surround the display area in the plan view.

5. A display device comprising:
a display area and a non-display area disposed around the display area and comprising a pad area,
a resistance checker disposed in the non-display area;
resistance test pads disposed in the pad area and arranged along a first direction;
resistance test lines connecting the resistance checker with the resistance test pads; and
crack test lines passing between the resistance checker and the resistance test pads,
wherein the resistance test lines intersect the crack test lines in a plan view, wherein each of the crack test lines comprises:
a first test line part connected to the crack detector,
a second test line part connected to the first test line part, and
a third test line part connected to the second test line part,
wherein the first test line part is extended in the first direction,
wherein the second test line part is extended in a second direction intersecting the first direction,
wherein the third test line part surrounds a longer side of the display area,
wherein the resistance checker is disposed on one side of the first test line part in the second direction so that the resistance checker is disposed closer to the display area than the first test line part is in the second direction, and
wherein a width of the resistance checker in the first direction is less than a length of the first test line part in the first direction.

6. The display device of claim 5, wherein the resistance test lines intersect the first test line part in the plan view.

7. The display device of claim 2, further comprising:
a printed circuit board attached on the pad area and electrically connected to the resistance test pads and the crack test pads, wherein the printed circuit board comprises a driving member.

8. The display device of claim 7, wherein the resistance test pads comprise an input resistance test pad and output resistance test pads, and wherein the driving member inputs a first voltage to the input resistance test pad and receives a second voltage from the output resistance test pads.

9. The display device of claim 8, wherein the resistance test lines comprise an input resistance test line connected to the input resistance test pad, and output resistance test lines connected to the output resistance test pads,
wherein the input resistance test line comprises a first input resistance test line physically connected to the input resistance test pad, and a second input resistance test line connecting between the first input resistance test line with the output resistance test lines, and
wherein the second input resistance test line comprises a bent portion.

10. The display device of claim 2, wherein the crack test pads and the resistance test pads are aligned with an edge of the display device.

11. The display device of claim 2, further comprising:
a substrate;
a first conductive layer disposed on the substrate;
a first insulating layer disposed on the first conductive layer;
a second conductive layer disposed on the first insulating layer;
a second insulating layer disposed on the second conductive layer;
a third conductive layer disposed on the second insulating layer;
a third insulating layer disposed on the third conductive layer; and
a fourth conductive layer disposed on the third insulating layer,
wherein the crack test lines are provided as the first conductive layer or the second conductive layer, and
wherein the resistance test lines are provided as the third conductive layer or the fourth conductive layer.

12. The display device of claim 1, further comprising:
a connection line branching off from the resistance test lines, and a pre-test pad connected to the connection line,
wherein the pre-test pad is disposed further inside than the resistance test lines.

13. The display device of claim 1, further comprising:
a connection line branching off from the resistance test lines,
wherein the connection line is aligned with an edge of the display device.

14. A display device comprising:
a display area and a non-display area disposed around the display area and comprising a pad area,
a resistance checker disposed in the non-display area;
resistance test pads disposed in the pad area;
resistance test lines connecting the resistance checker with the resistance test pad;
crack test lines;
a crack detector connected to the crack test lines; and
crack test pads disposed in the pad area and connected to the crack detector,
wherein an outermost side of the crack test pads and an outermost side of resistance test pads are aligned with an outermost edge of the display device,
wherein each of the crack test lines comprises a first test line part connected to the crack detector, a second test line part connected to the first test line part, and a third test line part connected to the second test line part,
wherein the first test line part is extended in a first direction,
wherein the second test line part is extended in a second direction intersecting the first direction,
wherein the third test line part surrounds a longer side of the display area, and
wherein a width of the resistance checker in the first direction is less than a length of the first test line part in the first direction.

15. The display device of claim 14, wherein the resistance test lines intersect the first test line part of the crack test lines in a plan view.

16. The display device of claim 15, wherein the resistance test lines intersect the first test line part and the second test line part in the plan view.

17. The display device of claim 15, wherein the resistance test lines intersect the first test line part and does not overlap the second test line part.

18. The display device of claim 14, further comprising:
a connection line branching off from the resistance test lines, and
a pre-test pad connected to the connection line,
wherein the pre-test pad is disposed further inside than the resistance test lines.

19. The display device of claim 14, further comprising:
a connection line branching off from the resistance test lines,
wherein the connection line is aligned with the edge of the display device.

20. The display device of claim 5, an entirety of the resistance test lines from the resistance checker to the resistance test pads only extend in the second direction and do not overlap the display area in the first direction.

21. The display device of claim 14, an entirety of the resistance test lines from the resistance checker to the resistance test pads only extend in the second direction and do not overlap the display area in the first direction.

* * * * *